United States Patent
Chen et al.

(10) Patent No.: US 11,310,848 B2
(45) Date of Patent: Apr. 19, 2022

(54) PAIRING METHOD, UNPAIRING METHOD, TERMINAL DEVICE, AND EXTERNALLY-CONNECTED DEVICE

(71) Applicant: Huawei Technologies Co., Ltd., Shenzhen (CN)

(72) Inventors: Yong Chen, Wuhan (CN); Chiengchang Lee, Shenzhen (CN); Liping Wang, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 138 days.

(21) Appl. No.: 16/643,412

(22) PCT Filed: Aug. 31, 2017

(86) PCT No.: PCT/CN2017/100078
§ 371 (c)(1),
(2) Date: Feb. 28, 2020

(87) PCT Pub. No.: WO2019/041278
PCT Pub. Date: Mar. 7, 2019

(65) Prior Publication Data
US 2020/0374954 A1 Nov. 26, 2020

(51) Int. Cl.
*H04W 4/00* (2018.01)
*H04W 76/14* (2018.01)
(Continued)

(52) U.S. Cl.
CPC ............. *H04W 76/14* (2018.02); *H04W 4/80* (2018.02); *H04W 8/005* (2013.01); *H04W 12/50* (2021.01)

(58) Field of Classification Search
CPC ... H04W 76/14; H04W 8/005; H04W 12/003; H04W 4/80; H04W 12/00; H04W 8/00
(Continued)

(56) References Cited

U.S. PATENT DOCUMENTS 8,340,577 B2 * 12/2012 Griffin ................. H04B 5/0062
455/41.2
8,467,770 B1 * 6/2013 Ben Ayed ............. H04L 63/107
455/411
(Continued)

FOREIGN PATENT DOCUMENTS

CN 102668396 A 9/2012
CN 104602230 A 5/2015
(Continued)

OTHER PUBLICATIONS

Gajbhiye, S., et al. "Design, implementation and security analysis of Bluetooth pairing protocol in NS2," XP032990033, International Conference on Advances in Computing, Communications and Informatics (ICACCI), Sep. 21-24, 2016, 7 pages.

*Primary Examiner* — Marceau Milord
(74) *Attorney, Agent, or Firm* — Conley Rose, P.C.

(57) ABSTRACT

A terminal device includes or connects to an external Hall device. The terminal device enters a to-be-connected state based on a Hall event generated by the Hall device, where terminal device is configured for connection to an externally device using a wireless communication protocol. The terminal device sends a trigger signal to enable the externally device to enter the to-be-connected state based on the trigger signal, and establishes the connection to the externally device using the wireless communication protocol.

20 Claims, 28 Drawing Sheets

(51) Int. Cl.
*H04W 4/80* (2018.01)
*H04W 8/00* (2009.01)
*H04W 12/50* (2021.01)

(58) Field of Classification Search
USPC .......................................................... 370/329
See application file for complete search history.

(56) References Cited

U.S. PATENT DOCUMENTS

| | | | | |
|---|---|---|---|---|
| 8,554,140 | B2* | 10/2013 | Klemmensen | H04W 76/14 455/41.2 |
| 8,744,357 | B2* | 6/2014 | Zhu | H04B 5/0043 455/41.2 |
| 8,768,306 | B1* | 7/2014 | Ben Ayed | H04W 12/069 455/411 |
| 8,907,782 | B2 | 12/2014 | Baker et al. | |
| 9,504,076 | B2* | 11/2016 | El-Hoiydi | H04W 84/18 |
| 9,807,546 | B2* | 10/2017 | Shen | G01R 33/07 |
| 9,826,340 | B2* | 11/2017 | Choi | H04W 4/80 |
| 10,574,637 | B2* | 2/2020 | Ding | H04L 9/14 |
| 2007/0070035 | A1 | 3/2007 | Asbury et al. | |
| 2010/0056055 | A1* | 3/2010 | Ketari | H04W 12/08 455/41.3 |
| 2011/0070825 | A1* | 3/2011 | Griffin | H04W 4/80 455/41.1 |
| 2011/0070826 | A1* | 3/2011 | Griffin | H04M 1/72412 455/41.1 |
| 2011/0070827 | A1* | 3/2011 | Griffin | H04M 1/72412 455/41.1 |
| 2011/0070828 | A1* | 3/2011 | Griffin | H04M 1/72412 455/41.1 |
| 2011/0070829 | A1* | 3/2011 | Griffin | H04B 5/02 455/41.1 |
| 2011/0070834 | A1 | 3/2011 | Griffin et al. | |
| 2011/0070837 | A1* | 3/2011 | Griffin | H04M 1/72412 455/41.3 |
| 2011/0143664 | A1* | 6/2011 | Fuccello | H04W 76/45 455/41.2 |
| 2011/0169654 | A1* | 7/2011 | Ketari | G08B 13/1427 340/687 |
| 2011/0313922 | A1* | 12/2011 | Ben Ayed | G06Q 20/32 705/42 |
| 2012/0154115 | A1* | 6/2012 | Errala | G07C 9/27 340/5.64 |
| 2012/0185071 | A1 | 7/2012 | Kwon | |
| 2013/0298208 | A1* | 11/2013 | Ayed | H04L 27/00 726/6 |
| 2014/0282877 | A1* | 9/2014 | Mahaffey | H04W 12/08 726/3 |
| 2015/0170504 | A1* | 6/2015 | Jooste | G08B 21/0269 340/539.12 |
| 2016/0128114 | A1 | 5/2016 | Moy et al. | |
| 2016/0205497 | A1* | 7/2016 | Shen | G01R 33/07 455/41.1 |
| 2016/0337863 | A1* | 11/2016 | Robinson | H04W 4/021 |
| 2016/0344712 | A1 | 11/2016 | Ding et al. | |
| 2017/0134950 | A1* | 5/2017 | Goldman | H04W 12/06 |

FOREIGN PATENT DOCUMENTS

| | | |
|---|---|---|
| CN | 104716994 A | 6/2015 |
| CN | 204707244 U | 10/2015 |
| CN | 205106604 U | 3/2016 |
| CN | 105722013 A | 6/2016 |
| CN | 105786731 A | 7/2016 |
| CN | 106712811 A | 5/2017 |
| EP | 2237582 A1 | 10/2010 |
| EP | 2302885 A1 | 3/2011 |
| WO | 2015172329 A1 | 11/2015 |

* cited by examiner (a)

After a tablet computer is paired with a Bluetooth keyboard (b)

PAIRING METHOD, UNPAIRING METHOD, TERMINAL DEVICE, AND EXTERNALLY-CONNECTED DEVICE

CROSS-REFERENCE TO RELATED APPLICATIONS

This application is a U.S. National Stage of International Patent Application No. PCT/CN2017/100078 filed on Aug. 31, 2017, which is hereby incorporated by reference in its entirety.

TECHNICAL FIELD

Embodiments of this application relate to the terminal field, and in particular, to a pairing method, an unpairing method, a terminal device, and an externally-connected device.

BACKGROUND

Bluetooth (Bluetooth) is a radio technology that supports short range (usually within 10 m) communication between devices. The Bluetooth works at a globally available 2.4 GHz wireless wave band, and can be used to perform data transmission between devices such as a mobile phone, a notebook computer, a wireless headset, and a vehicle-mounted tool. Currently, an externally-connected device having a Bluetooth function is often used with a terminal device such as a tablet computer or a mobile phone together. For example, a Bluetooth keyboard and a tablet computer are used together to enter a character, and a Bluetooth headset and a mobile phone are used together to listen to music. Before data transmission is performed between the externally-connected device having a Bluetooth function and the terminal device, the externally-connected device having a Bluetooth function needs to pair with and connect to the terminal device. For example, before a user enters a character by using a Bluetooth keyboard and a tablet computer, the Bluetooth keyboard needs to pair with and connect to the tablet computer. After the pairing and connection succeed, the user can enter the character by using the Bluetooth keyboard. Certainly, the terminal device may alternatively pair with and connect to the externally-connected device by using another wireless communication protocol. The Bluetooth keyboard needs to be disconnected from the tablet computer after the Bluetooth keyboard is no longer used.

However, in the prior art, processes in which a terminal device pairs with, connects to, and disconnects from an externally-connected device are relatively complex and are inconvenient for a user to use.

SUMMARY

Embodiments of this application provide a pairing method, an unpairing method, a terminal device, and an externally-connected device, to resolve a problem that processes in which a terminal device pairs with, connects to, and disconnects from an externally-connected device are relatively complex and are inconvenient for a user to use.

According to a first aspect of the embodiments of this application, a pairing system is provided. The pairing system may include a terminal device and an externally-connected device.

The terminal device includes a first Hall device and a first magnet. The externally-connected device includes a second Hall device and a second magnet. The terminal device turns on a Bluetooth switch of the terminal device and/or enters a Bluetooth discoverable state based on a Hall event generated by the first Hall device when the second magnet approaches. The externally-connected device turns on a pairing switch of the externally-connected device and/or enters the Bluetooth discoverable state based on a Hall event generated by the second Hall device when the first magnet approaches. The terminal device establishes a connection to the externally-connected device by using a Bluetooth protocol.

According to the pairing system provided in this embodiment of this application, the terminal device automatically turns on the Bluetooth switch of the terminal device and/or enters the Bluetooth discoverable state based on the Hall event generated by the first Hall device; and the externally-connected device automatically turns on the pairing switch of the externally-connected device and/or enters the Bluetooth discoverable state based on the Hall event generated by the second Hall device. In this case, the terminal device establishes the connection to the externally-connected device by using the Bluetooth protocol. This resolves a problem that processes in which the terminal device pairs with and connects to the externally-connected device are relatively complex and are inconvenient for a user to use, and further implements plug and play in a case of password-free authentication.

With reference to the first aspect, in a possible implementation, the terminal device breaks the connection to the externally-connected device based on a Hall disconnection event generated by the first Hall device when the second magnet is far away. This achieves an unplugging and disconnection effect.

With reference to the first aspect or the foregoing possible implementation, in another possible implementation, the externally-connected device breaks the connection to the terminal device based on a Hall disconnection event generated by the second Hall device when the first magnet is far away. This achieves an unplugging and disconnection effect.

According to a second aspect of the embodiments of this application, a pairing method is provided and applied to a terminal device. The terminal device includes a Hall device, or the terminal device connects to a Hall device. The pairing method may include:

entering, by the terminal device, a to-be-connected state based on a Hall event generated by the Hall device, where the to-be-connected state is a state in which the terminal device can establish a connection to an externally-connected device by using a wireless communication protocol; sending, by the terminal device, a trigger signal, to enable the externally-connected device to enter the to-be-connected state based on the trigger signal; and establishing, by the terminal device, the connection to the externally-connected device by using the wireless communication protocol.

According to the pairing method provided in this embodiment of this application, the terminal device automatically enters the to-be-connected state based on the Hall event generated by the Hall device, and sends the trigger signal to trigger the externally-connected device to also automatically enter the to-be-connected state, so that the terminal device establishes the connection to the externally-connected device by using the wireless communication protocol. This resolves a problem that processes in which the terminal device pairs with and connects to the externally-connected device are relatively complex and are inconvenient for a user to use, and further implements plug and play in a case of password-free authentication.

With reference to the second aspect, in a possible implementation, the wireless communication protocol is a Bluetooth protocol; and before the establishing, by the terminal device, the connection to the externally-connected device by using the wireless communication protocol, the pairing method may further include: when the externally-connected device is a security device, requesting, by the terminal device, a connection key from the externally-connected device in a just works (Just works) manner. This prevents a user from manually entering a pairing code, and simplifies a pairing and connection process.

With reference to the second aspect or the foregoing possible implementation, in another possible implementation, the wireless communication protocol is a Bluetooth protocol; and before the establishing, by the terminal device, the connection to the externally-connected device by using the wireless communication protocol, the pairing method may further include: when the externally-connected device is not a security device, requesting, by the terminal device, a connection key from the externally-connected device in a connection key (Link Key) manner. This ensures security of a device connection.

With reference to the second aspect or the foregoing possible implementations, in another possible implementation, the pairing method may further include: determining, by the terminal device, whether the externally-connected device is the security device.

With reference to the second aspect or the foregoing possible implementations, in another possible implementation, before the determining, by the terminal device, whether the externally-connected device is the security device, the pairing method may further include: receiving, by the terminal device, mark information of the externally-connected device. In this case, correspondingly, the determining, by the terminal device, whether the externally-connected device is the security device may specifically include: determining, by the terminal device, whether the mark information of the externally-connected device is the same as prestored mark information, where the externally-connected device is the security device when the mark information of the externally-connected device is the same as the prestored mark information, or the externally-connected device is not the security device when the mark information of the externally-connected device is different from the prestored mark information.

With reference to the second aspect or the foregoing possible implementations, in another possible implementation, after the establishing, by the terminal device, the connection to the externally-connected device by using the wireless communication protocol, the pairing method may further include: breaking, by the terminal device, the connection to the externally-connected device based on a Hall disconnection event generated by the Hall device. This implements unplugging and disconnection.

With reference to the second aspect or the foregoing possible implementations, in another possible implementation, after the breaking, by the terminal device, the connection to the externally-connected device based on a Hall disconnection event generated by the Hall device, the pairing method may further include: deleting, by the terminal device, pairing information stored when the terminal device connects to the externally-connected device, where the pairing information includes at least one of the following: address information of the externally-connected device, a service type of the externally-connected device, and the connection key used when the terminal device connects to the externally-connected device.

With reference to the second aspect or the foregoing possible implementations, in another possible implementation, the trigger signal is a Hall signal.

With reference to the second aspect or the foregoing possible implementations, in another possible implementation, the wireless communication protocol is a Bluetooth protocol; and the entering, by the terminal device, a to-be-connected state based on a Hall event generated by the Hall device may specifically include: turning on, by the terminal device, a Bluetooth switch and entering a Bluetooth discoverable state based on the Hall event; or entering, by the terminal device, a Bluetooth discoverable state based on the Hall event; or turning on, by the terminal device, a Bluetooth switch based on the Hall event.

According to a third aspect of the embodiments of this application, an unpairing method is provided and applied to a terminal device. The terminal device includes a Hall device, or the terminal device connects to a Hall device. The unpairing method may include:

breaking, by the terminal device, a wireless connection to an externally-connected device based on a Hall disconnection event generated by the Hall device.

According to the unpairing method provided in this embodiment of this application, the terminal device automatically breaks the wireless connection to the externally-connected device based on the Hall disconnection event generated by the Hall device. This implements unplugging and disconnection and improves user experience.

According to a fourth aspect of the embodiments of this application, a pairing method is provided and applied to an externally-connected device. The externally-connected device includes a Hall device, or the externally-connected device connects to a Hall device. The method may include:

entering, by the externally-connected device, a to-be-connected state based on a Hall event generated by the Hall device, where the to-be-connected state is a state in which the externally-connected device can establish a connection to a terminal device by using a wireless communication protocol; sending, by the externally-connected device, a trigger signal, to enable the terminal device to enter the to-be-connected state based on the trigger signal; and establishing, by the externally-connected device, the connection to the terminal device by using the wireless communication protocol.

According to the pairing method provided in this embodiment of this application, the externally-connected device automatically enters the to-be-connected state based on the Hall event generated by the Hall device, and sends the trigger signal to trigger the terminal device to also automatically enter the to-be-connected state, so that the externally-connected device establishes the connection to the terminal device by using the wireless communication protocol. This resolves a problem that processes in which the terminal device pairs with and connects to the externally-connected device are relatively complex and are inconvenient for a user to use, and further implements plug and play in a case of password-free authentication.

With reference to the fourth aspect, in a possible implementation, after the establishing, by the externally-connected device, the connection to the terminal device by using the wireless communication protocol, the method may further include: breaking, by the externally-connected device, the connection to the terminal device based on a Hall disconnection event generated by the Hall device. This implements unplugging and disconnection.

With reference to the fourth aspect or the foregoing possible implementation, in another possible implementation, the entering, by the externally-connected device, a to-be-connected state based on a Hall event generated by the Hall device may specifically include: turning on, by the externally-connected device, a pairing switch and entering a Bluetooth discoverable state based on the Hall event; or entering, by the externally-connected device, a Bluetooth discoverable state based on the Hall event, or turning on, by the externally-connected device, a pairing switch based on the Hall event.

According to a fifth aspect of the embodiments of this application, a pairing method is provided, including:

discovering, by a terminal device, an externally-connected device by using a first wireless communication protocol, and entering a to-be-connected state, where the to-be-connected state is a state in which the terminal device can establish a connection to the externally-connected device by using a second wireless communication protocol, a signal coverage area of the first wireless communication protocol is different from a signal coverage area of the second wireless communication protocol, and the externally-connected device is in the to-be-connected state; and establishing, by the terminal device, the connection to the externally-connected device by using the second wireless communication protocol.

According to the pairing method provided in this embodiment of this application, both the terminal device and the externally-connected device discover each other by using the first wireless communication protocol, and enter the to-be-connected state; and the terminal device and the externally-connected device establish the connection by using the second wireless communication protocol. This resolves a problem that processes in which the terminal device pairs with and connects to the externally-connected device are relatively complex and are inconvenient for a user to use, and further implements plug and play in a case of password-free authentication. In addition, the second wireless communication protocol does not need to keep always enabled, reducing power consumption of the terminal.

According to a sixth aspect of the embodiments of this application, a terminal device is provided. The terminal device includes a Hall device, or the terminal device connects to a Hall device. The terminal device may include a processing unit, a sending unit, and a connection unit.

The processing unit is configured to enter a to-be-connected state based on a Hall event generated by the Hall device, where the to-be-connected state is a state in which the terminal device can establish a connection to an externally-connected device by using a wireless communication protocol; the sending unit is configured to send a trigger signal, to enable the externally-connected device to enter the to-be-connected state based on the trigger signal; and the connection unit is configured to establish the connection to the externally-connected device by using the wireless communication protocol.

With reference to the sixth aspect, in a possible implementation, the wireless communication protocol is a Bluetooth protocol; and the terminal device may further include a request unit, configured to: when the externally-connected device is a security device, request a connection key from the externally-connected device in a just works manner.

With reference to the sixth aspect or the foregoing possible implementation, in another possible implementation, the wireless communication protocol is a Bluetooth protocol; and the terminal device may further include a request unit, configured to: when the externally-connected device is not a security device, request a connection key from the externally-connected device in a link key manner.

With reference to the sixth aspect or the foregoing possible implementations, in another possible implementation, the terminal device may further include: a determining unit, configured to determine whether the externally-connected device is the security device.

With reference to the sixth aspect or the foregoing possible implementations, in another possible implementation, the terminal device may further include: a receiving unit, configured to receive mark information of the externally-connected device; and the determining unit is specifically configured to determine whether the mark information of the externally-connected device is the same as prestored mark information, where the externally-connected device is the security device when the mark information of the externally-connected device is the same as the prestored mark information, or the externally-connected device is not the security device when the mark information of the externally-connected device is different from the prestored mark information.

With reference to the sixth aspect or the foregoing possible implementations, in another possible implementation, the terminal device may further include: a connection breaking unit, configured to break the connection to the externally-connected device based on a Hall disconnection event generated by the Hall device.

With reference to the sixth aspect or the foregoing possible implementations, in another possible implementation, the terminal device may further include: a deletion unit, configured to delete pairing information stored when the terminal device connects to the externally-connected device, where the pairing information includes at least one of the following: address information of the externally-connected device, a service type of the externally-connected device, and the connection key used when the terminal device connects to the externally-connected device.

With reference to the sixth aspect or the foregoing possible implementations, in another possible implementation, the trigger signal is a Hall signal.

With reference to the sixth aspect or the foregoing possible implementations, in another possible implementation, the wireless communication protocol is a Bluetooth protocol; and the processing unit is specifically configured to: turn on a Bluetooth switch and enter a Bluetooth discoverable state based on the Hall event; or enter a Bluetooth discoverable state based on the Hall event; or turn on a Bluetooth switch based on the Hall event.

According to a seventh aspect of the embodiments of this application, a terminal device is provided. The terminal device includes a Hall device, or the terminal device connects to a Hall device. The terminal device may include: a connection breaking unit, configured to break a wireless connection to an externally-connected device based on a Hall disconnection event generated by the Hall device.

According to an eighth aspect of the embodiments of this application, an externally-connected device is provided. The externally-connected device includes a Hall device, or the externally-connected device connects to a Hall device. The externally-connected device may include a processing unit, a sending unit, and a connection unit.

The processing unit is configured to enter a to-be-connected state based on a Hall event generated by the Hall device, where the to-be-connected state is a state in which the externally-connected device can establish a connection to a terminal device by using a wireless communication protocol; the sending unit is configured to send a trigger signal, to enable the terminal device to enter the to-be-connected state based on the trigger signal; and the connection unit is configured to establish the connection to the terminal device by using the wireless communication protocol.

With reference to the eighth aspect, in a possible implementation, the externally-connected device may further include: a connection breaking unit, configured to break the connection to the terminal device based on a Hall disconnection event generated by the Hall device.

With reference to the eighth aspect or the foregoing possible implementation, in another possible implementation, the processing unit is specifically configured to: turn on a pairing switch and enter a Bluetooth discoverable state based on the Hall event; or enter a Bluetooth discoverable state based on the Hall event; or turn on a pairing switch based on the Hall event.

According to a ninth aspect of the embodiments of this application, a terminal device is provided. The terminal device may include a processing unit and a connection unit.

The processing unit is configured to discover an externally-connected device by using a first wireless communication protocol, and enter a to-be-connected state, where the to-be-connected state is a state in which the terminal device can establish a connection to the externally-connected device by using a second wireless communication protocol, a signal coverage area of the first wireless communication protocol is different from a signal coverage area of the second wireless communication protocol, and the externally-connected device is in the to-be-connected state; and the connection unit is configured to establish the connection to the externally-connected device by using the second wireless communication protocol.

According to a tenth aspect of the embodiments of this application, a terminal device is provided. The terminal device includes a Hall device, or the terminal device connects to a Hall device. The terminal device may include at least one processor and a memory. The memory is configured to store a computer program, so that when the computer program is executed by the at least one processor, the pairing method in any one of the second aspect or the possible implementations of the second aspect is implemented.

Specifically, the processor is configured to enter a to-be-connected state based on a Hall event generated by the Hall device, where the to-be-connected state is a state in which the terminal device can establish a connection to an externally-connected device by using a wireless communication protocol; send a trigger signal, to enable the externally-connected device to enter the to-be-connected state based on the trigger signal; and establish the connection to the externally-connected device by using the wireless communication protocol.

With reference to the tenth aspect, in a possible implementation, the wireless communication protocol is a Bluetooth protocol; and the processor is further configured to: when the externally-connected device is a security device, request a connection key from the externally-connected device in a just works manner. This prevents a user from manually entering a pairing code, and simplifies a pairing and connection process.

With reference to the tenth aspect or the foregoing possible implementation, in another possible implementation, the wireless communication protocol is a Bluetooth protocol; and the processor is further configured to: when the externally-connected device is not a security device, request, by the terminal device, a connection key from the externally-connected device in a link key manner. This ensures security of a device connection.

With reference to the tenth aspect or the foregoing possible implementations, in another possible implementation, the processor is further configured to determine whether the externally-connected device is the security device.

With reference to the tenth aspect or the foregoing possible implementations, in another possible implementation, the processor is further configured to receive mark information of the externally-connected device. In this case, correspondingly, the processor is specifically configured to determine whether the mark information of the externally-connected device is the same as prestored mark information, where the externally-connected device is the security device when the mark information of the externally-connected device is the same as the prestored mark information, or the externally-connected device is not the security device when the mark information of the externally-connected device is different from the prestored mark information.

With reference to the tenth aspect or the foregoing possible implementations, in another possible implementation, the processor is further configured to break the connection to the externally-connected device based on a Hall disconnection event generated by the Hall device. This implements unplugging and disconnection.

With reference to the tenth aspect or the foregoing possible implementation, in another possible implementation, the processor is further configured to delete pairing information stored when the terminal device connects to the externally-connected device, where the pairing information includes at least one of the following: address information of the externally-connected device, a service type of the externally-connected device, and the connection key used when the terminal device connects to the externally-connected device.

With reference to the tenth aspect or the foregoing possible implementations, in another possible implementation, the trigger signal is a Hall signal.

With reference to the tenth aspect or the foregoing possible implementations, in another possible implementation, the wireless communication protocol is a Bluetooth protocol; and the processor is specifically configured to: turn on, by the terminal device, a Bluetooth switch and enter a Bluetooth discoverable state based on the Hall event; or enter, by the terminal device, a Bluetooth discoverable state based on the Hall event; or turn on, by the terminal device, a Bluetooth switch based on the Hall event.

Alternatively, the memory is configured to store a computer program, so that when the computer program is executed by the at least one processor, the unpairing method in the third aspect is implemented.

Specifically, the processor is configured to break a wireless connection to an externally-connected device based on a Hall disconnection event generated by the Hall device.

Alternatively, the memory is configured to store a computer program, so that when the computer program is executed by the at least one processor, the unpairing method in the fifth aspect is implemented.

Specifically, the processor is configured to discover an externally-connected device by using a first wireless communication protocol, and enter a to-be-connected state, where the to-be-connected state is a state in which the terminal device can establish a connection to the externally-connected device by using a second wireless communication protocol, a signal coverage area of the first wireless communication protocol is different from a signal coverage area of the second wireless communication protocol, and the externally-connected device is in the to-be-connected state;

and the terminal device establishes the connection to the externally-connected device by using the second wireless communication protocol.

According to an eleventh aspect of the embodiments of this application, an externally-connected device is provided. The externally-connected device includes a Hall device, or the externally-connected device connects to a Hall device. The externally-connected device includes at least one processor and a memory. The memory is configured to store a computer program, so that when the computer program is executed by the at least one processor, the pairing method in any one of the fourth aspect or the possible implementations of the fourth aspect is implemented.

Specifically, the processor is configured to enter a to-be-connected state based on a Hall event generated by the Hall device, where the to-be-connected state is a state in which the externally-connected device can establish a connection to a terminal device by using a wireless communication protocol; send a trigger signal, to enable the terminal device to enter the to-be-connected state based on the trigger signal; and establish the connection to the terminal device by using the wireless communication protocol.

With reference to the eleventh aspect, in a possible implementation, the processor is further configured to break the connection to the terminal device based on a Hall disconnection event generated by the Hall device. This implements unplugging and disconnection.

With reference to the eleventh aspect or the foregoing possible implementation, in another possible implementation, the processor is specifically configured to: turn on a pairing switch and enter a Bluetooth discoverable state based on the Hall event; or enter a Bluetooth discoverable state based on the Hall event; or turn on a pairing switch based on the Hall event.

According to a twelfth aspect of the embodiments of this application, a computer storage medium is provided. The computer storage medium stores a computer program. When the computer program is executed by a processor, the pairing method in any one of the second aspect or the possible implementations of the second aspect is implemented, the unpairing method in the third aspect is implemented, or the pairing method in the fifth aspect is implemented.

According to a thirteenth aspect of the embodiments of this application, a computer storage medium is provided. The computer storage medium stores a computer program. When the computer program is executed by a processor, the pairing method in any one of the fourth aspect or the possible implementations of the fourth aspect is implemented.

According to a fourteenth aspect of the embodiments of this application, a computer program product is provided. When the computer program product is run on a computer, the computer is enabled to perform the pairing method in any one of the second aspect or the possible implementations of the second aspect, implement the unpairing method in the third aspect, or implement the pairing method in the fifth aspect.

According to a fifteenth aspect of the embodiments of this application, a computer program product is provided. When the computer program product is run on a computer, the computer is enabled to perform the pairing method in any one of the fourth aspect or the possible implementations of the fourth aspect.

According to a sixteenth aspect of the embodiments of this application, a chip system is provided, including at least one processor and a memory.

The memory is configured to store a computer program, so that when the computer program is executed by the at least one processor, the pairing method in any one of the second aspect or the possible implementations of the second aspect is implemented, the unpairing method in the third aspect is implemented, or the pairing method in the fifth aspect is implemented, to enable a terminal device in which the chip system is located to establish a wireless connection to an externally-connected device.

DESCRIPTION OF EMBODIMENTS

Generally, before data transmission is performed between an externally-connected device having a Bluetooth function and a terminal device, the externally-connected device having a Bluetooth function needs to pair with and connect to the terminal device. To implement interoperation between various applications, the Bluetooth special interest group (Bluetooth Special Interest Group, SIG) formulates Bluetooth technical specifications.

The Bluetooth technical specifications include a core protocol (protocol) and an application profile (profile). The core protocol includes the lowest four layers (Layer), one basic service discovery protocol (Service Discover Protocol, SDP), and basic general access profiles (General Access Profile, GAP) of all application profiles in a Bluetooth protocol stack. The core protocol is essential to the Bluetooth protocol stack.

In addition to the core protocol, the Bluetooth technical specifications need to include some other application layer services and protocols, for example, an application layer profile. Interoperable remote devices need to use a same protocol stack, and different applications need different protocol stacks. Not all applications need to use all protocols, and only one or more layers of the protocol stack may be used. However, all the applications need to use a data link layer and a physical layer in the Bluetooth technical specifications.

Figure 1A:
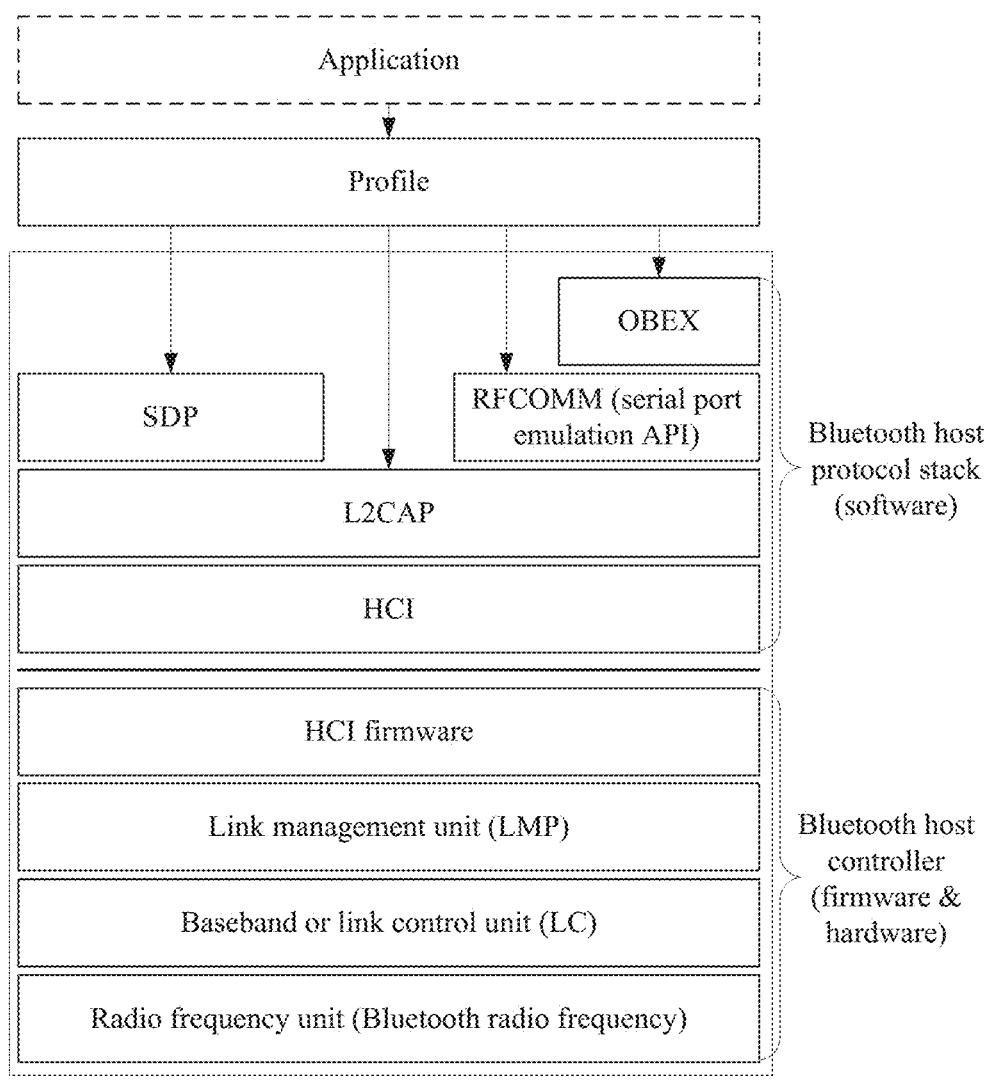
FIG. 1A is a schematic diagram of a Bluetooth architecture according to an embodiment of this application.

A Bluetooth architecture is shown in FIG. 1A. In the Bluetooth architecture, a radio frequency unit, namely, a Bluetooth radio frequency (Bluetooth Radio) unit, is mainly responsible for sending and receiving data and voice, and is characterized by a short range and low power consumption.

A baseband or link control unit (Baseband Link Controller, LC) mainly performs mutual conversion between a radio frequency signal and a digital or voice signal, and implements a procedure of a connection between a baseband protocol and another underlying layer.

A link management protocol (Link Manager protocol, LMP) is a data link layer protocol in the Bluetooth protocol stack. A link management unit is responsible for communication between Bluetooth devices, and implements operations such as link establishment, verification, and configuration.

Host controller interface protocol (Host Controller Interface Protocol, HCl) firmware (Firmware) mainly provides, in a form of an HCl command, a capability of accessing a baseband controller, a link manager, a hardware status register, a control register, and an event register of Bluetooth hardware.

An HCl is a protocol between a logical link control and adaptation protocol layer and a link management protocol layer in a Bluetooth system. The HCl provides an upper layer protocol with a unified interface for accessing the link manager and a unified manner of accessing a baseband.

A logical link control and adaptation protocol (Logical Link Control and Adaptation Protocol, L2CAP) is an adaptation protocol that shields a baseband protocol for the upper layer protocol, and is located over the baseband protocol. The L2CAP belongs to the data link layer, and provides an upper layer with connection-oriented and connectionless data services to complete functions such as protocol multiplexing, segmentation and reassembly, quality of service (Quality Of Service, QoS) transmission, and group abstraction.

A radio frequency communications protocol (Radio Frequency Communications Protocol, RFCOMM) provides emulation for a serial port emulation API (Serial Emulation API), including emulation for a data signal line and a non-data signal line. The radio frequency communications protocol not only can emulate a plurality of serial ports between two devices, but also can support emulation of a plurality of serial ports between a plurality of devices. In addition, the RFCOMM further provides emulation for a modem.

The SDP is a critical layer in a Bluetooth technical framework. The SDP is a basis of all application models, and implementation of any Bluetooth application model is a result of using some services. In a Bluetooth wireless communications system, any two or more devices established on a Bluetooth link may start to communicate with each other at any time. Therefore, only a static setting is not enough. The SDP determines dynamic manners of these service locations, and supports dynamic query of device information and service types, so as to establish a communication channel corresponding to a required service.

An object exchange protocol (Object Exchange Protocol, OBEX) is a session layer protocol formulated by the Infrared Data Association (infrared data association, IrDA) for data object exchange on an infrared data link. The Bluetooth SIG uses this protocol. Therefore, an original OBEX application based on an infrared link may be easily migrated to Bluetooth or switched between the infrared link and Bluetooth. The OBEX is an efficient binary protocol and exchanges objects in a simple and spontaneous manner.

Figure 1:
FIG. 1 is a schematic diagram of a scenario according to an embodiment of this application.

For example, as shown in FIG. 1, before a user enters a character by using a Bluetooth keyboard and a tablet computer, based on the Bluetooth architecture, the Bluetooth keyboard needs to pair with and connect to the tablet computer.

In an example, a process in which the Bluetooth keyboard pairs with and connects to the tablet computer by using a man-machine interaction device (Human Interface Device, HID) protocol includes the following step 1 to step 7.

Figure 2:
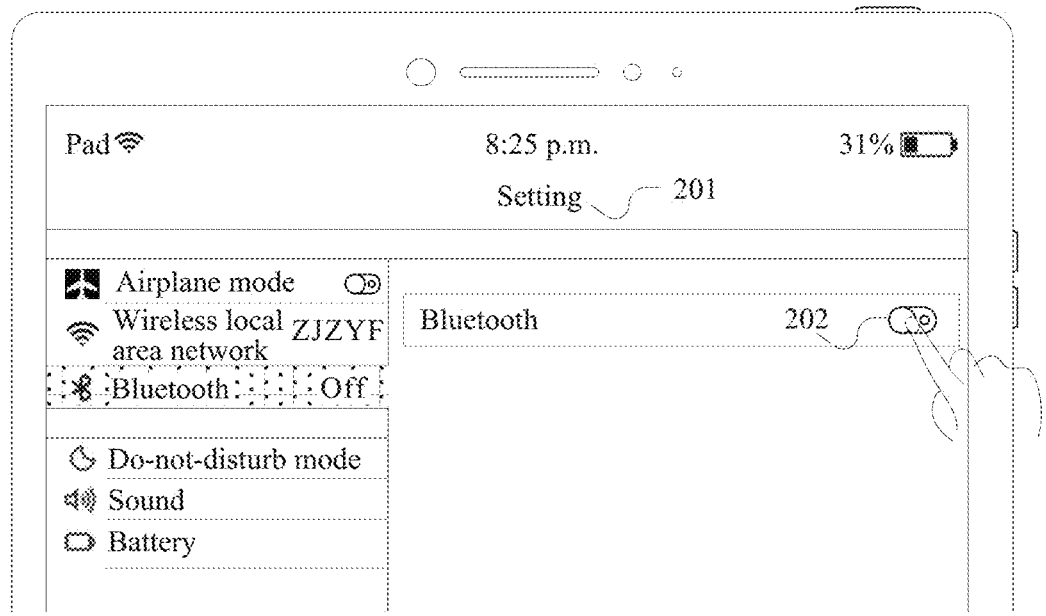
FIG. 2 is a first schematic diagram of a display interface of a device according to an embodiment of this application.

Step 1: When the tablet computer is in an unlocked state, as shown in FIG. 2, a user turns on a Bluetooth switch 202 of the tablet computer on a setting interface 201 of the tablet computer. In this case, the tablet computer may be used as a primary device, enters a Bluetooth scanning state, and performs frequency hopping at a relatively high speed to page a secondary device.

Figure 3:
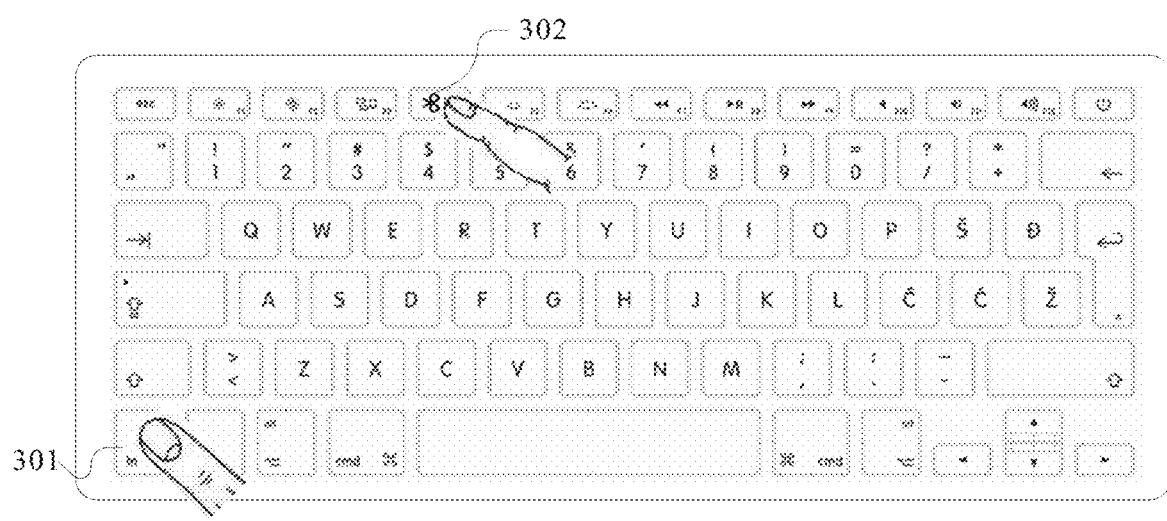
FIG. 3 is a first schematic diagram of an operation according to an embodiment of this application.

In addition, the user presses a pairing switch (for example, an independently disposed pairing switch, a push key, an Fn key+a key with a Bluetooth identifier, or a power switch) of the Bluetooth keyboard to enable the Bluetooth keyboard to enter a pairing mode. That is, the Bluetooth keyboard used as the secondary device enters a Bluetooth discoverable state, performs frequency hopping at a relatively low speed, and broadcasts information of the Bluetooth keyboard. The information may include a media access control (Media Access Control, MAC) address and that a device type supported by the Bluetooth keyboard is a keyboard type. For example, as shown in FIG. 3, when the pairing switch is the Fn key+the key with a Bluetooth identifier, the user needs to simultaneously press an Fn key 301 and a key 302 with a Bluetooth identifier, to enable the Bluetooth keyboard to enter the Bluetooth discoverable state.

It should be noted that in this embodiment of this application, only an example in which the tablet computer is used as the primary device and the Bluetooth keyboard is used as the secondary device is used for description. In an actual application, alternatively, the Bluetooth keyboard may be used as the primary device and the tablet computer may be used as the secondary device. No specific limitation is imposed herein. In addition, for a frequency hopping speed of the primary device and a frequency hopping speed of the secondary device, only an example in which the primary device performs frequency hopping at the relatively high speed and the secondary device performs frequency hopping at the relatively low speed is used for description in this embodiment of this application. No specific limitation is imposed herein.

Figure 4:
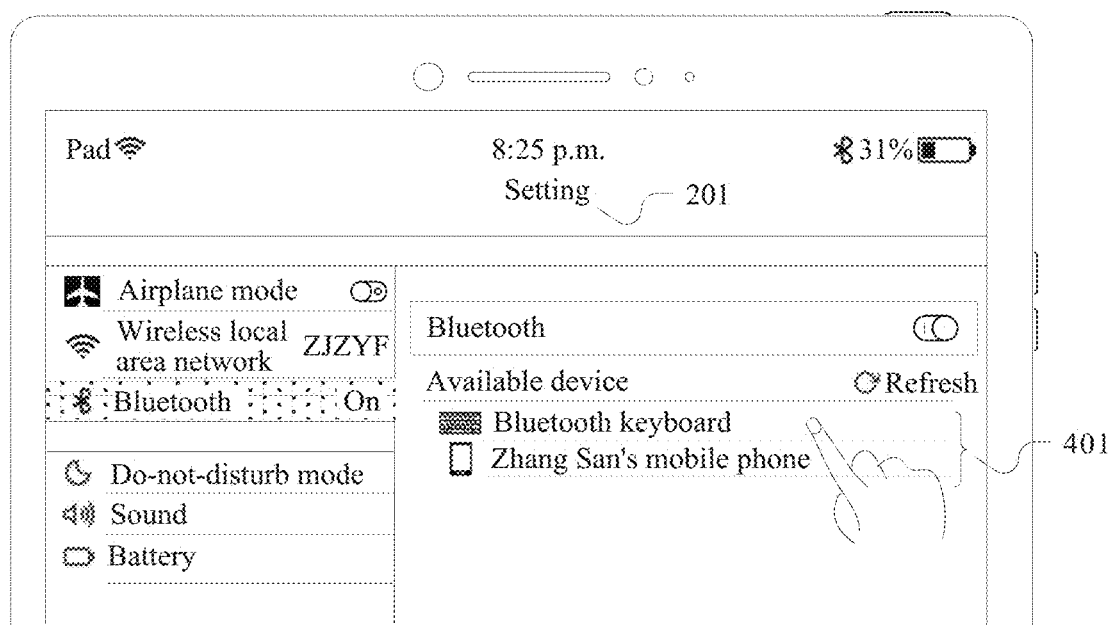
FIG. 4 is a second schematic diagram of a display interface of a device according to an embodiment of this application.

Step 2: When the tablet computer and the Bluetooth keyboard are synchronized to a same frequency hopping pattern (Hopping Pattern), the tablet computer discovers, through scanning, the Bluetooth keyboard (Bluetooth Keyboard), and displays an available device list 401, as shown in FIG. 4. For example, as shown in FIG. 4, names and device types of available devices are displayed. In this case, the user may perform a trigger operation on a displayed name "Bluetooth keyboard".

Step 3: After the user performs the trigger operation on the displayed name "Bluetooth keyboard", the tablet computer may send a pairing request to the Bluetooth keyboard based on the MAC address returned by the Bluetooth keyboard in step 2. After receiving the pairing request, the Bluetooth keyboard responds to the pairing request.

Figure 5:
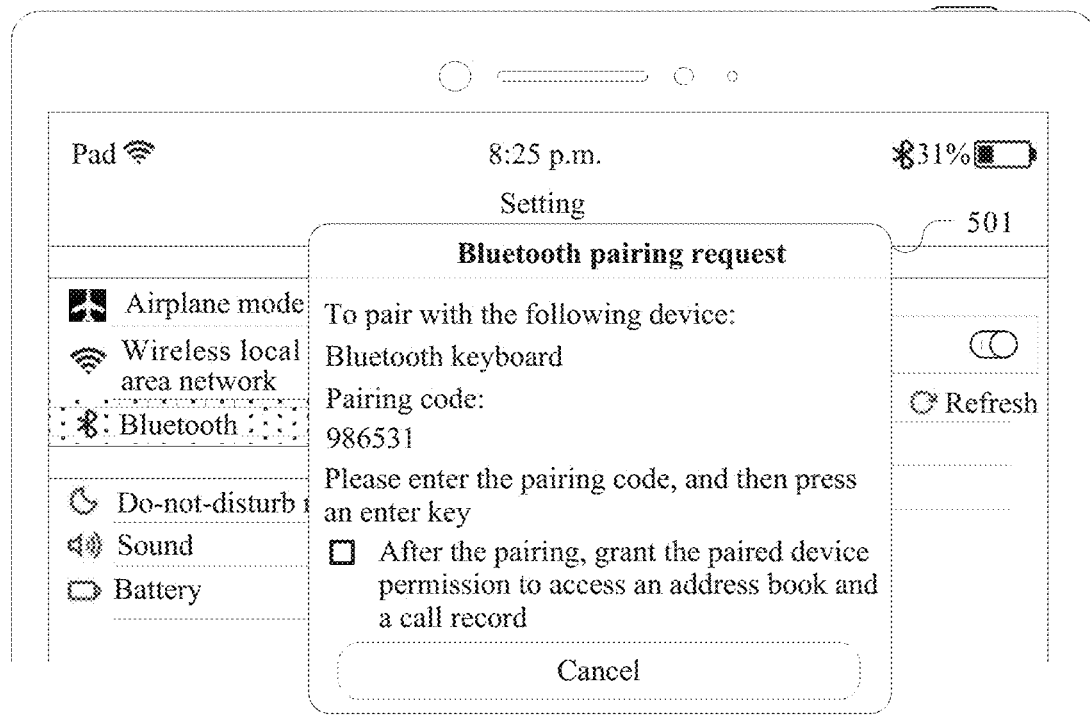
FIG. 5 is a third schematic diagram of a display interface of a device according to an embodiment of this application.

Step 4: The tablet computer sends a connection key request message to the Bluetooth keyboard based on the MAC address of the Bluetooth keyboard. In addition, as shown in FIG. 5, a pairing code character interface 501 that requires input by the user by using the Bluetooth keyboard is displayed, and on the pairing code character interface 501, a pairing code is 986531.

Figure 6:
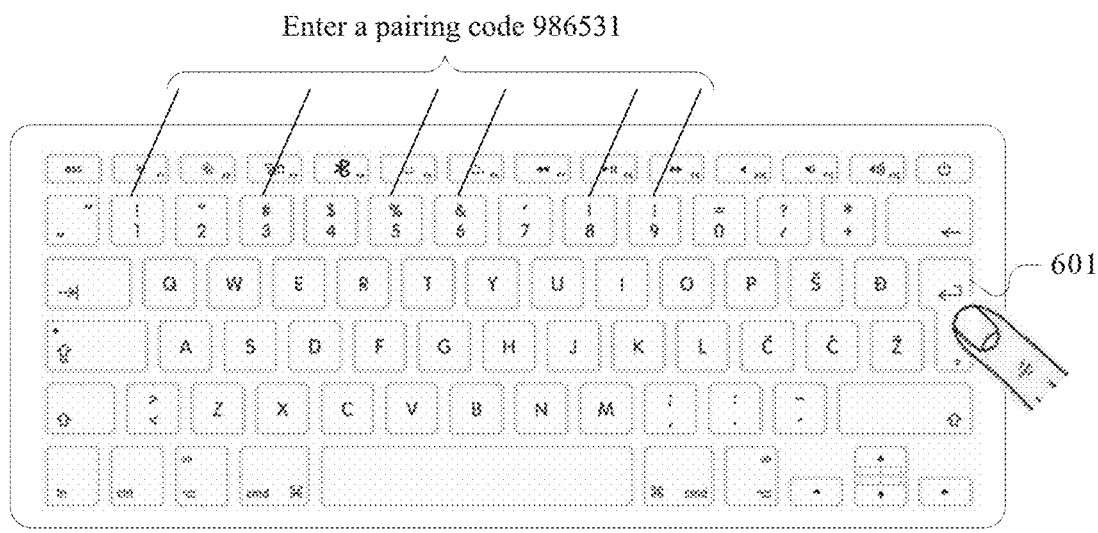
FIG. 6 is a second schematic diagram of an operation according to an embodiment of this application.

Step 5: As shown in FIG. 6, the user enters the pairing code 986531 on the Bluetooth keyboard, and presses an enter key 601. The Bluetooth keyboard returns the pairing code entered by the user to the tablet computer. After receiving the pairing code returned by the Bluetooth keyboard, the tablet computer performs character verification, that is, determines whether the pairing code returned by the Bluetooth keyboard is consistent with the pairing code included on the pairing code character interface 501. If the pairing code returned by the Bluetooth keyboard is consistent with the pairing code included on the pairing code character interface 501, the verification succeeds, and the Bluetooth keyboard completes pairing with the tablet computer.

Step 6: The tablet computer sends a service discovery protocol (Service Discovery Protocol, SDP) service request to the Bluetooth keyboard to obtain a service type supported by the Bluetooth keyboard. After receiving the SDP service request, the Bluetooth keyboard returns the keyboard service type supported by the Bluetooth keyboard to the tablet computer. If the Bluetooth keyboard further supports other service types (for example, a human interface device (Human Interface Device, HID), a headset profile (Headset Profile, HSP), a message access profile (Message Access Profile, MAP), a phonebook access profile (Phonebook Access Profile, PBAP), and a personal area network (Personal Area Networking, PAN)), the Bluetooth keyboard may further return a list of service types supported by the Bluetooth keyboard to the tablet computer. The list of service types includes the other service types supported by the Bluetooth keyboard.

Step 7: The tablet computer sends a connection request to the Bluetooth keyboard based on the service type supported by the Bluetooth keyboard in step 6. After receiving the connection request, the Bluetooth keyboard confirms the connection request. A connection between the Bluetooth keyboard and the tablet computer is completed.

After step 1 to step 7 are completed, the user may enter the character by using the Bluetooth keyboard and the tablet computer. In addition, after entering the character by using the Bluetooth keyboard ends, the user further needs to break the connection between the tablet computer and the Bluetooth keyboard. For example, the user turns off the Bluetooth switch of the tablet computer on a setting interface of the tablet computer; or the user taps, on a setting interface of the tablet computer, a name of a connected externally-connected device to be disconnected, namely, the name "Bluetooth keyboard", the tablet computer displays a prompt window to ask whether the user needs to break the connection to the Bluetooth keyboard, and the user taps a "Confirm" key; or the user turns off the power switch of the Bluetooth keyboard.

However, it can be learned that the user needs to perform a series of complicated operations in processes in which the Bluetooth keyboard pairs with, connects to, and disconnects from the tablet computer, for example, an operation of turning on the Bluetooth switch 202 of the tablet computer in FIG. 2, an operation of pressing the pairing switch of the Bluetooth keyboard in FIG. 3, a trigger operation on a name of a to-be-connected device in FIG. 4, entering the pairing code by using the Bluetooth keyboard in FIG. 6, and an operation of pressing the enter key 601. The processes in which the Bluetooth keyboard pairs with, connects to, and disconnects from the tablet computer are relatively complex and are inconvenient for the user to use. That is, plug and play as well as unplugging and disconnection cannot be implemented.

To resolve a problem that processes in which a terminal device pairs with, connects to, and disconnects from an externally-connected device are relatively complex and are inconvenient for a user to use, the embodiments of this application provide a pairing method and an unpairing method. When a terminal device approaches an externally-connected device, the terminal device can automatically establish a connection to the externally-connected device, achieving an "enable once touching" effect; when the terminal device is far away from the externally-connected device, the terminal device can automatically disconnect from the externally-connected device. The following describes the implementations of the embodiments of this application in detail with reference to accompanying drawings.

Figure 7:
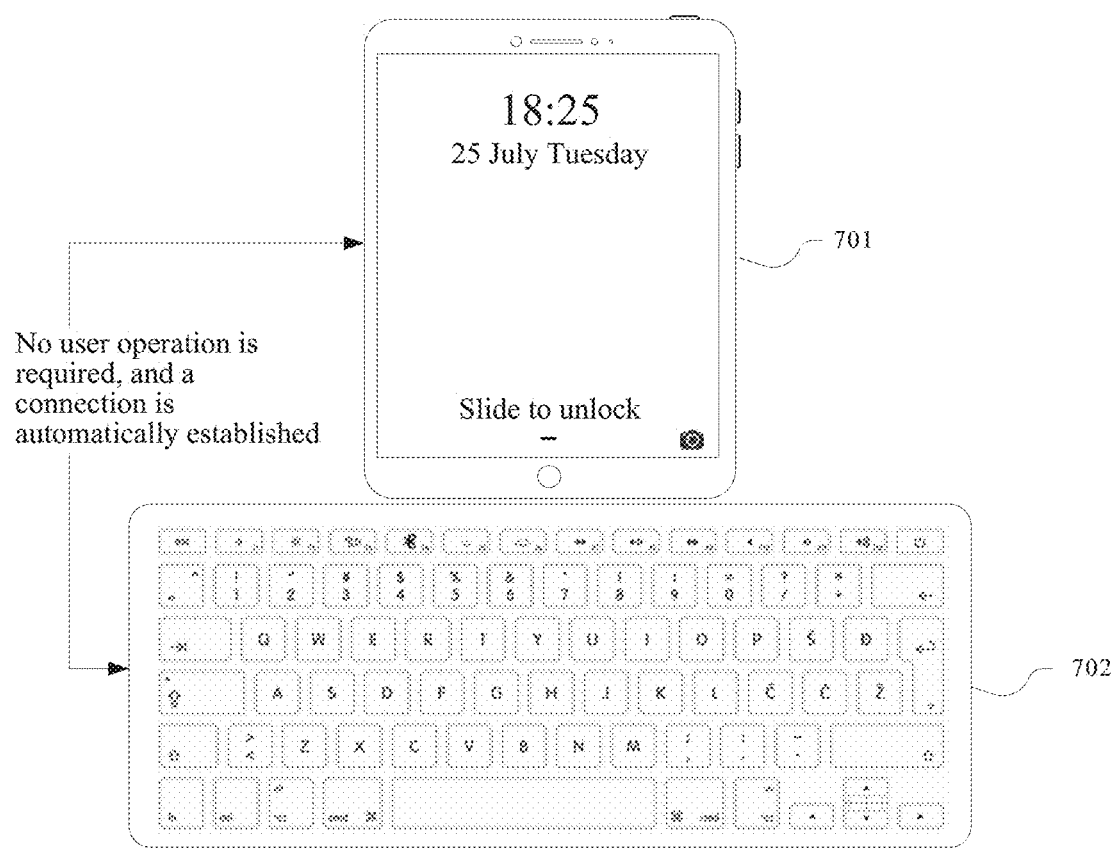
FIG. 7 is a simplified schematic diagram of a system architecture according to an embodiment of this application.

FIG. 7 is a simplified schematic diagram of a system architecture that can be applied to the embodiments of this application. As shown in FIG. 7, the system architecture may include a terminal device 701 and an externally-connected device 702.

The terminal device 701 is a device that supports establishment of a connection to the externally-connected device 702 by using a wireless communication protocol. In specific implementation, the terminal device 701 may be a desktop computer, a laptop computer, a tablet computer, a handheld computer, a mobile phone, a notebook computer, an ultra-mobile personal computer (Ultra-mobile Personal Computer, UMPC), a netbook, a cellular phone, a personal digital assistant (Personal Digital Assistant, PDA), a television set, a VR device, an AR device, or the like. An example in which the terminal device 701 is a tablet computer is shown in FIG. 7.

The externally-connected device 702 is a device that supports establishment of a connection to the terminal device 701 by using a wireless communication protocol. In specific implementation, the externally-connected device 702 may be a wearable device, smart glasses, a smartwatch, a keyboard, a stereo, a printer, a smart home device, a vehicle, a vehicle-mounted tool, an inkcase, an earphone, a wristband, or the like. The terminal device 701 and the externally-connected device 702 are interchangeable. The smart home device may be a water dispenser, an air conditioner, a refrigerator, or the like. An example in which the externally-connected device 702 is a keyboard is shown in FIG. 7.

In this embodiment of this application, a distance between the terminal device 701 and the externally-connected device 702 meets a first condition. That is, when the terminal device 701 approaches the externally-connected device 702, both the terminal device 701 and the externally-connected device 702 can automatically enter a state in which a connection can be established by using a wireless communication protocol, and a user does not need to perform any operation on the terminal device 701 and the externally-connected device 702. Further, the connection can be automatically established by using the wireless communication protocol, achieving a plug and play effect. For example, if the wireless communication protocol is a Bluetooth protocol, when the terminal device 701 approaches the externally-connected device 702, the terminal device 701 may automatically turn on a Bluetooth switch and enter a Bluetooth scanning state as a primary device, and the externally-connected device 702 may automatically turn on a pairing switch and enter a Bluetooth discoverable state as a secondary device.

A means for triggering the terminal device 701 and the externally-connected device 702 to automatically enter the state in which a connection can be established by using a wireless communication protocol may be: disposing a "Hall device-magnet" device pair in the terminal device 701 and the externally-connected device 702; disposing a proximity sensor in the terminal device 701 and the externally-connected device 702; or disposing a proximity detection module such as a near field communication (Near Field Communication, NFC) label in the terminal device 701 and the externally-connected device 702. Certainly, the terminal device 701 and the externally-connected device 702 may alternatively be triggered in a manner of broadcasting an ibeacon by the terminal device 701, to automatically enter the state in which a connection can be established by using a wireless communication protocol. The means for triggering the terminal device 701 and the externally-connected device 702 to automatically enter the state in which a connection can be established by using a wireless communication protocol is not specifically limited herein.

The wireless communication protocol used when the terminal device 701 establishes a connection to the externally-connected device 702 may be a wireless fidelity (wireless fidelity, Wi-Fi) protocol, a Bluetooth (Bluetooth) protocol, a ZigBee protocol, an NFC protocol, or the like. No specific limitation is imposed herein. The Bluetooth protocol may be a HID protocol, an HSP protocol, a MAP protocol, or the like.

In addition, alternatively, a means for triggering the terminal device 701 and the externally-connected device 702 to automatically enter the state in which a connection can be established by using a wireless communication protocol may be: triggering, by using a first wireless communication protocol, the terminal device 701 and the externally-connected device 702 to automatically enter a state in which a connection can be established by using a second wireless communication protocol, so that the terminal device 701 establishes a connection to the externally-connected device 702 by using the second wireless communication protocol, where a signal coverage area of the first wireless communication protocol is greater than a signal coverage area of the second wireless communication protocol. For example, the first wireless communication protocol is a Wi-Fi protocol and the second wireless communication protocol is a Bluetooth protocol. The first wireless communication protocol used to trigger the terminal device 701 and the externally-connected device 702 to enter the state in which a connection can be established by using a second wireless communication protocol, in other words, to discover each other may be a Wi-Fi protocol, a Bluetooth protocol, a ZigBee protocol, an NFC protocol, or the like. No specific limitation is imposed herein.

It should be noted that, in this embodiment of this application, a means for triggering the terminal device 701 to automatically enter the state in which a connection can be established by using a wireless communication protocol may alternatively be different from a means for triggering the externally-connected device 702 to automatically enter the state in which a connection can be established by using a wireless communication protocol, provided that the terminal device 701 and the externally-connected device 702 that establish the connection can discover each other. For example, the means for triggering the terminal device 701 to automatically enter the state in which a connection can be established by using a wireless communication protocol is: disposing a Hall device in the terminal device 701, and disposing a magnet in the externally-connected device 702; and the means for triggering the externally-connected device 702 to automatically enter the state in which a connection can be established by using a wireless communication protocol is disposing a proximity sensor in the terminal device 701.

For example, the terminal device 701 establishes the connection to the externally-connected device 702 by using the Bluetooth protocol. In this case, "Hall device-magnet" device pairs may be respectively disposed in the terminal device 701 and the externally-connected device 702 in advance. Generally, when the distance between the terminal device 701 and the externally-connected device 702 is less than or equal to 5 centimeters (cm), the Hall device sends a signal to a device processor, and both the terminal device 701 and the externally-connected device 702 can automatically enter a state in which the connection can be established by using the Bluetooth protocol. Further, pairing and connection may be automatically completed by using the Bluetooth protocol.

For another example, the terminal device 701 establishes the connection to the externally-connected device 702 by using the Bluetooth protocol, and proximity sensors or near field communication (Near Field Communication, NFC) labels are respectively pre-configured in the terminal device 701 and the externally-connected device 702. When the distance between the terminal device 701 and the externally-connected device 702 meets a given condition, both the terminal device 701 and the externally-connected device 702 can automatically enter a state in which the connection can be established by using the Bluetooth protocol. Further, pairing and connection may be automatically completed by using the Bluetooth protocol.

For still another example, the terminal device 701 establishes the connection to the externally-connected device 702 by using the Bluetooth protocol. When the distance between the terminal device 701 and the externally-connected device 702 meets a given condition, the terminal device 701 may alternatively broadcast an ibeacon to trigger both the terminal device 701 and the externally-connected device 702 to automatically enter a state in which the connection can be established by using the Bluetooth protocol. Further, pairing and connection may be automatically completed by using the Bluetooth protocol.

Further, in this embodiment of this application, when the distance between the terminal device 701 and the externally-connected device 702 meets a second condition, that is, when the terminal device 701 is far away from the externally-connected device 702, the terminal device 701 can automatically break the connection to the externally-connected device 702, achieving an unplugging and disconnection effect.

For ease of understanding, in this embodiment of this application, an example in which the terminal device 701 is a tablet computer is used for description. The following specifically describes each component of the tablet computer with reference to the accompanying drawings.

Figure 8:
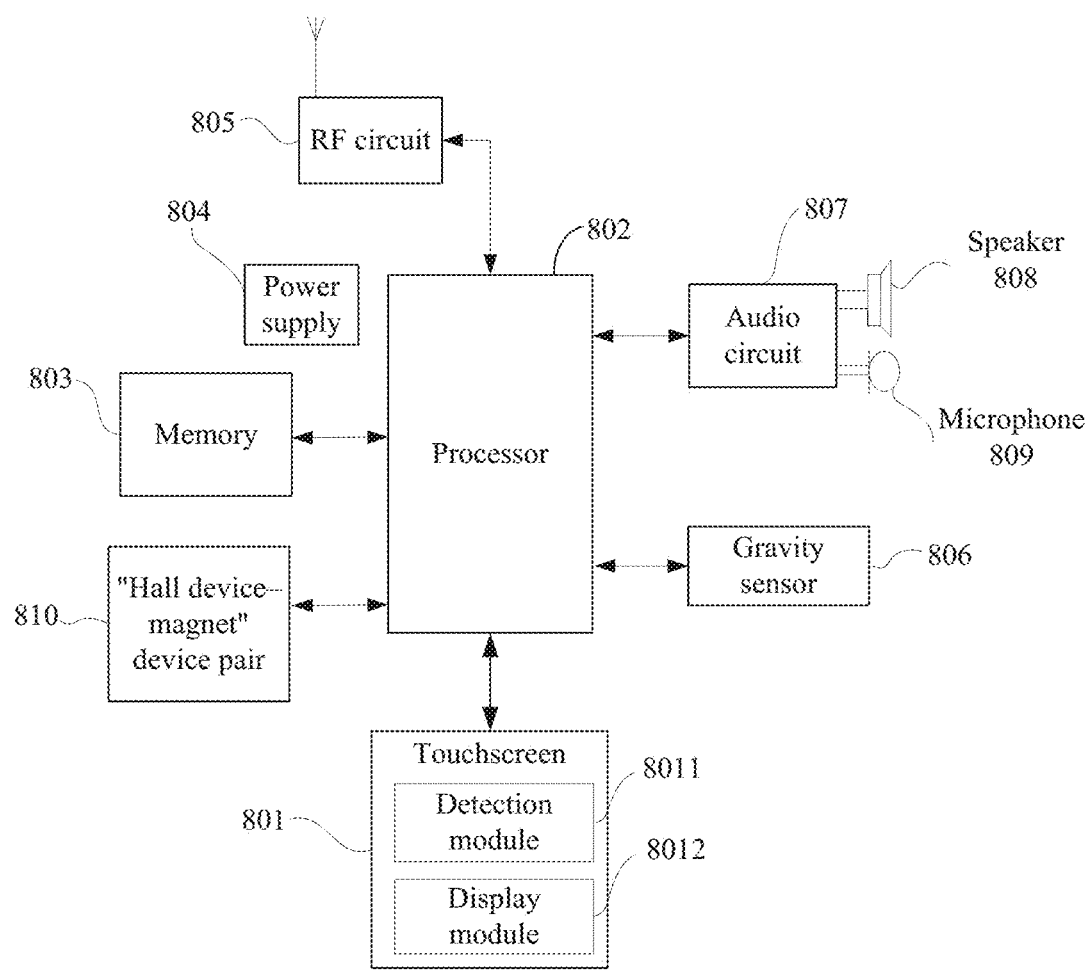
FIG. 8 is a schematic composition diagram of a tablet computer according to an embodiment of this application.

As shown in FIG. 8, the tablet computer may include components such as a touchscreen 801, a processor 802, a memory 803, a power supply 804, a radio frequency (Radio Frequency. RF) circuit 805, a gravity sensor 806, an audio circuit 807, a speaker 808, and a microphone 809. These components may be connected by using a bus, or may be directly connected.

Moreover, in this embodiment of this application, the tablet computer may further include a proximity detection module. For example, the proximity detection module is a "Hall device-magnet" device pair, a proximity sensor, or an NFC label.

A person skilled in the art may understand that a structure of the tablet computer shown in FIG. 8 does not constitute a limitation on the tablet computer, and the tablet computer may include components more than those shown in the figure, or combine some components, or have a different component deployment.

The proximity detection module is configured to: when the tablet computer approaches an externally-connected device, trigger both the tablet computer and the externally-connected device to automatically enter a state in which a connection can be established by using a wireless communication protocol. An example in which the proximity detection module is a "Hall device-magnet" device pair 810 is shown in FIG. 8.

The touchscreen 801, also referred to as a touch and display panel, is configured to implement input and output functions of the tablet computer, may collect a touch operation performed by a user on or near the touchscreen 801 (such as an operation performed by the user on or near the touchscreen 801 by using a finger or any proper object or accessory such as a stylus), and drive a corresponding connection apparatus according to a preset program. The touchscreen 801 may be further configured to display information entered by the user or information provided for the user (for example, an image collected by using a camera), and various menus of the tablet computer. For example, the touchscreen 801 may be implemented in various types, such as a resistive type, a capacitive type, an infrared light sensing type, and an ultrasonic type. This is not limited in this embodiment of this application. The operation performed by the user near the touchscreen 801 may be referred to as floating touch. A touchscreen on which floating touch can be performed may be implemented in a capacitive manner, an infrared light sensing manner, an ultrasonic manner, or the like.

For example, in this embodiment of this application, the touchscreen 801 may include a detection module 8011 and a display module 8012. The detection module 8011 may detect a touch operation performed by the user on the touchscreen 801, and may transfer, to the processor 802, a parameter generated by the touchscreen 801 after the touch operation is performed on the touchscreen 801 (for example, if the touchscreen 801 is implemented in the capacitive type, the detection module 8011 may transfer a change parameter on the touchscreen 801 to the processor 802, and the change parameter is a magnitude, a shape, a quantity, and distribution of a capacitor whose capacitance value changes), so that the processor 802 performs corresponding processing based on the touch operation. The display module 8012 may display the information entered by the user, the information provided by the tablet computer for the user, the menus of the tablet computer, and the like.

The processor 802 is a control center of the tablet computer, connects to all components of the entire tablet computer by using various interfaces and lines, and runs or executes a software program and/or a module stored in the memory 803 and invokes data stored in the memory 803, to perform functions of the tablet computer and process data, so as to perform overall monitoring on the tablet computer. In specific implementation, in an embodiment, the processor 802 may include one or more processing units. An application processor and a modem processor may be integrated with the processor 802. The application processor primarily processes an operating system, a user interface, an application program, and the like, and the modem processor primarily processes wireless communication. It may be understood that the foregoing modem processor may not be integrated into the processor 802.

The memory 803 may be configured to store data, the software program, and the module. The memory 803 may be a volatile memory (Volatile Memory), for example, a random access memory (Random-Access Memory, RAM); may be a non-volatile memory (Non-Volatile Memory), for example, a read-only memory (Read-Only Memory, ROM), a flash memory (Flash Memory), a hard disk drive (Hard Disk Drive, HDD), or a solid state drive (Solid-State Drive, SSD); or may be a combination of the foregoing types of memories. Specifically, the memory 803 may store program code. The program code is used to enable the processor 802 to perform, by executing the program code, the pairing method and the unpairing method provided in the embodiments of this application.

The power supply 804 may be a battery, and is logically connected to the processor 802 by using a power supply management system, to implement functions such as charging management, discharging management, and power consumption management by using the power supply management system.

The RF circuit 805 may be configured to receive and transmit information, or receive and send signals in a call process. In particular, the RF circuit 805 provides received information for the processor 802 for processing, and sends a signal generated by the processor 802. Usually, the RF circuit includes but is not limited to an antenna, at least one amplifier, a transceiver, a coupler, a low noise amplifier (Low Noise Amplifier, LNA), a duplexer, and the like. In addition, the RF circuit 805 may further communicate with a network and another device through wireless communication.

The gravity sensor (Gravity Sensor) 806 may detect a magnitude of acceleration of the tablet computer in each direction (generally, three axes), may detect, in a stationary state, a magnitude and a direction of gravity, and may be used for an application that identifies a posture of the tablet computer (for example, screen switching between a landscape mode and a portrait mode, a related game, or magnetometer posture calibration), a vibration-identification-related function (for example, a pedometer and tapping), and the like. It should be noted that the tablet computer may further include another sensor such as a pressure sensor, a light sensor, a gyroscope, a barometer, a hygrometer, a thermometer, or an infrared sensor. Details are not described herein.

The audio circuit 807, the speaker 808, and the microphone 809 may provide an audio interface between the user and the tablet computer. The audio circuit 807 may transmit, to the speaker 808, an electrical signal converted from received audio data, and the speaker 808 converts the electrical signal into a sound signal for output. In addition, the microphone 809 converts a collected sound signal into an electrical signal, and the audio circuit 807 receives the electrical signal, converts the electrical signal into audio data, and then outputs the audio data to the RF circuit 805, to send the audio data to, for example, another tablet computer, or outputs the audio data to the processor 802 for further processing.

In addition, an operating system runs above the foregoing components. An application program may be installed and run on the operating system.

The tablet computer may further include components such as a Wi-Fi module, a Bluetooth module, and a camera although they are not shown.

The Wi-Fi module may be a module including a Wi-Fi chip and a driver of the Wi-Fi chip. The Wi-Fi chip has a capability of running a wireless internet standard protocol. The Bluetooth module is a printed circuit board assembly (Printed Circuit Board Assembly, PCBA) integrating with a Bluetooth function, and is configured for short-range wireless communication.

In this embodiment of this application, an example in which the externally-connected device 702 is a Bluetooth keyboard is used for description. The following specifically describes each component of the Bluetooth keyboard with reference to the accompanying drawings.

Figure 8A:
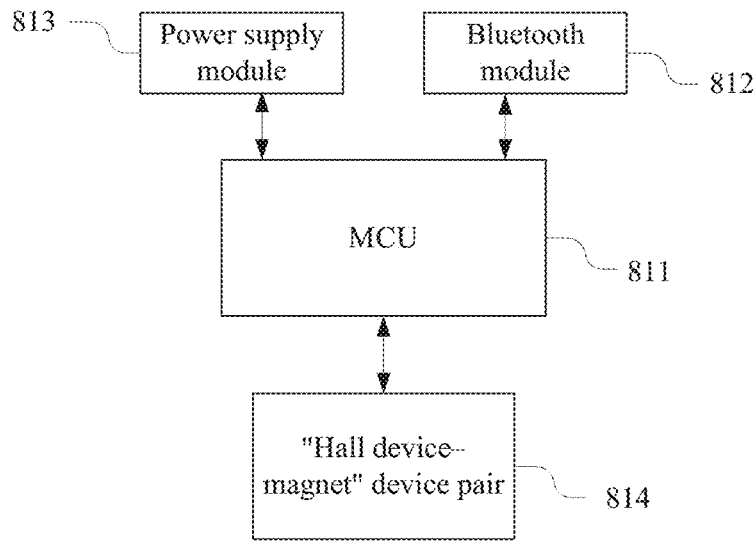
FIG. 8A is a schematic composition diagram of a Bluetooth keyboard according to an embodiment of this application.

As shown in FIG. 8A, the Bluetooth keyboard may include components such as a microprogrammed control unit (Microprogrammed Control Unit, MCU) 811, a Bluetooth module 812, and a power supply module 813. These components may be connected by using a bus, or may be directly connected. Moreover, in this embodiment of this application, the Bluetooth keyboard may further include a proximity detection module. For example, the proximity detection module is a "Hall device-magnet" device pair, a proximity sensor, or an NFC label.

A person skilled in the art may understand that a structure of the Bluetooth keyboard shown in FIG. 8A does not constitute a limitation on the Bluetooth keyboard, and the Bluetooth keyboard may include components more than those shown in the figure, or combine some components, or have a different component deployment.

The proximity detection module is configured to: when the Bluetooth keyboard approaches a terminal device, trigger both the Bluetooth keyboard and the terminal device to automatically enter a state in which a connection can be established by using a wireless communication protocol. An example in which the proximity detection module is a "Hall device-magnet" device pair 814 is shown in FIG. 8A.

The MCU 811 is a control center of the Bluetooth keyboard, and connects to all components of the entire Bluetooth keyboard by using various interfaces and lines.

The Bluetooth module 812 is a PCBA integrating with a Bluetooth function, and is configured for short-range wireless communication.

The power supply module 813 may be a battery, and implements functions such as charging management, discharging management, and power consumption management by using a power supply management system.

Figure 9:
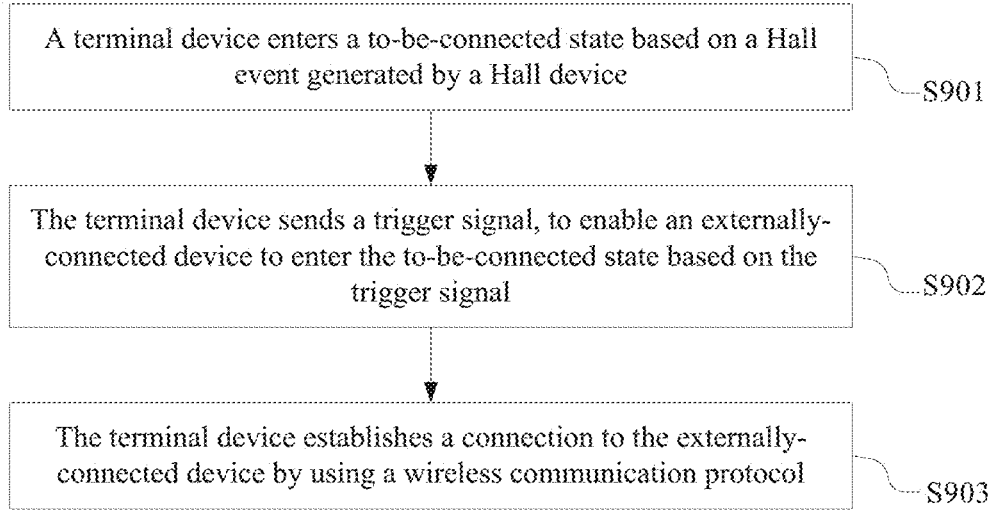
FIG. 9 is a schematic flowchart of a pairing method according to an embodiment of this application.

FIG. 9 is a flowchart of a pairing method according to an embodiment of this application. The method is applied to a terminal device. The terminal device includes a Hall device, or the terminal device connects to a Hall device. As shown in FIG. 9, the method may include the following steps.

S901. The terminal device enters a to-be-connected state based on a Hall event generated by the Hall device.

The to-be-connected state is a state in which the terminal device can establish a connection to an externally-connected device by using a wireless communication protocol. For example, a magnet is disposed in the externally-connected device in advance. When the terminal device and the externally-connected device approach each other, the Hall device of the terminal device may detect approaching of the magnet of the externally-connected device, and the Hall device of the terminal device generates the Hall event. In this case, the terminal device enters the to-be-connected state based on the Hall event. In the to-be-connected state, the terminal device can establish the connection to the externally-connected device by using the wireless communication protocol.

S902. The terminal device sends a trigger signal, to enable the externally-connected device to enter the to-be-connected state based on the trigger signal.

When the terminal device approaches the externally-connected device, the terminal device may send the trigger signal to trigger the externally-connected device to also enter the to-be-connected state. For example, the trigger signal may be a Hall signal. For example, a magnet may be disposed in the terminal device in advance, and a Hall device may be disposed in the externally-connected device in advance, so that the Hall signal is sent when the magnet of the terminal device approaches the Hall device of the externally-connected device, that is, the Hall device of the externally-connected device can detect approaching of the magnet of the terminal device. In this case, the Hall device of the externally-connected device generates a Hall event, and the externally-connected device may enter the to-be-connected state based on the Hall event.

For another example, a proximity sensor may be disposed in the externally-connected device. When the terminal device approaches the externally-connected device, the proximity sensor of the externally-connected device can detect approaching of the terminal device, so as to trigger the externally-connected device to enter the to-be-connected state.

S903. The terminal device establishes the connection to the externally-connected device by using the wireless communication protocol.

After both the terminal device and the externally-connected device enter the to-be-connected state, the terminal device may establish the connection to the externally-connected device by using the wireless communication protocol.

According to the pairing method provided in this embodiment of this application, the terminal device automatically enters the to-be-connected state based on the Hall event generated by the Hall device, and sends the trigger signal to trigger the externally-connected device to also automatically enter the to-be-connected state, so that the terminal device establishes the connection to the externally-connected device by using the wireless communication protocol. This resolves a problem that processes in which the terminal device pairs with and connects to the externally-connected device are relatively complex and are inconvenient for a user to use.

Figure 10:
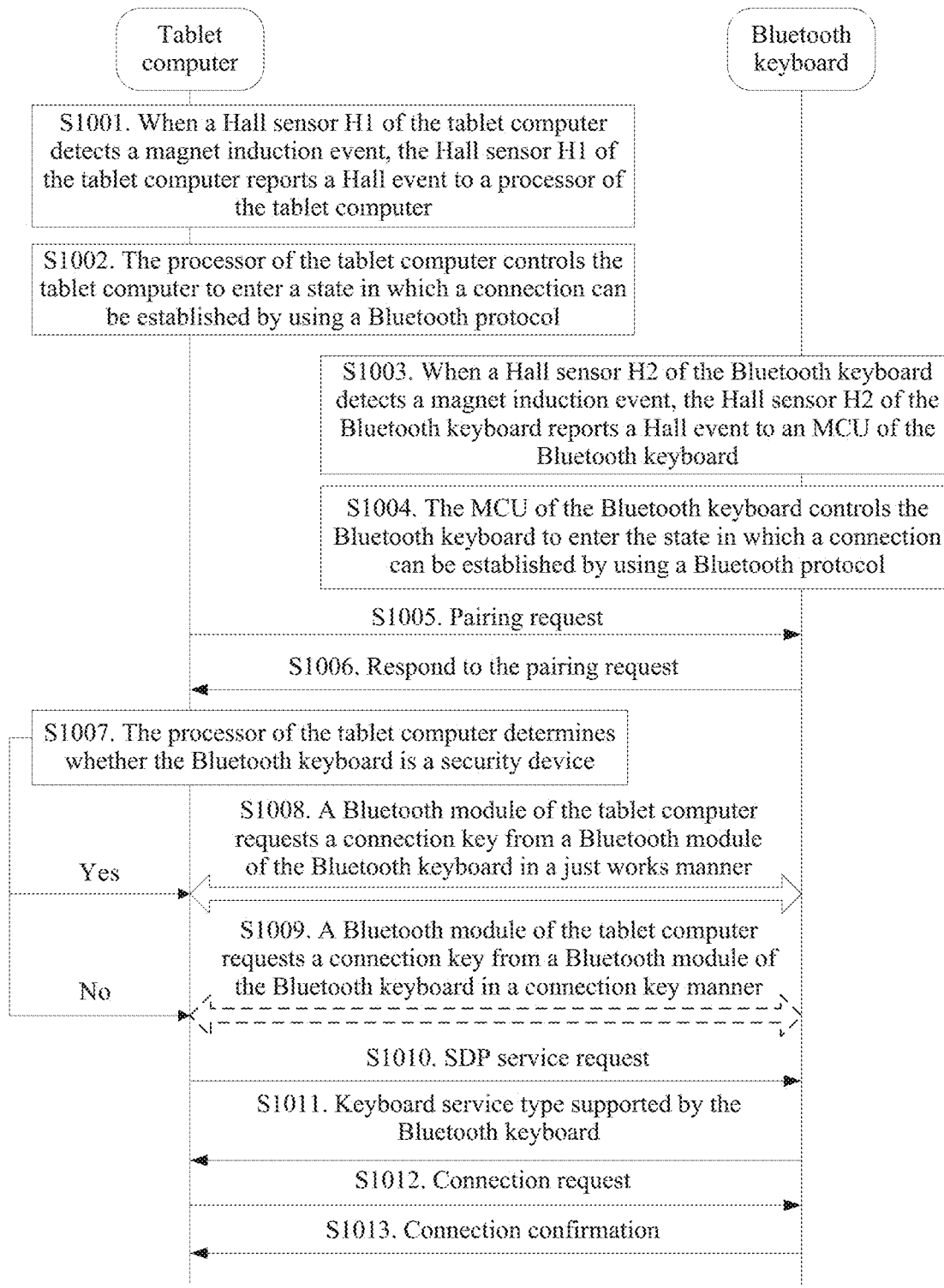
FIG. 10 is a schematic flowchart of another pairing method according to an embodiment of this application.

FIG. 10 is a flowchart of another pairing method according to an embodiment of this application. For ease of understanding by a person skilled in the art, in this embodiment of this application, the pairing method provided in this embodiment of this application is specifically described by using an example in which a terminal device is a tablet computer, an externally-connected device is a Bluetooth keyboard, the tablet computer establishes a connection to the Bluetooth keyboard by using a Bluetooth protocol, and a means for triggering the tablet computer and the Bluetooth keyboard to automatically enter a state in which a connection can be established by using the Bluetooth protocol is disposing "Hall device-magnet" device pairs in the tablet computer and the Bluetooth keyboard. As shown in FIG. 10, the method may include the following steps.

In an example, the Hall device may be specifically a Hall sensor. The "Hall device-magnet" device pairs are respectively disposed at pairing positions of the tablet computer and the Bluetooth keyboard. The "Hall device-magnet" device pair includes a Hall sensor and a magnet.

Figure 11:
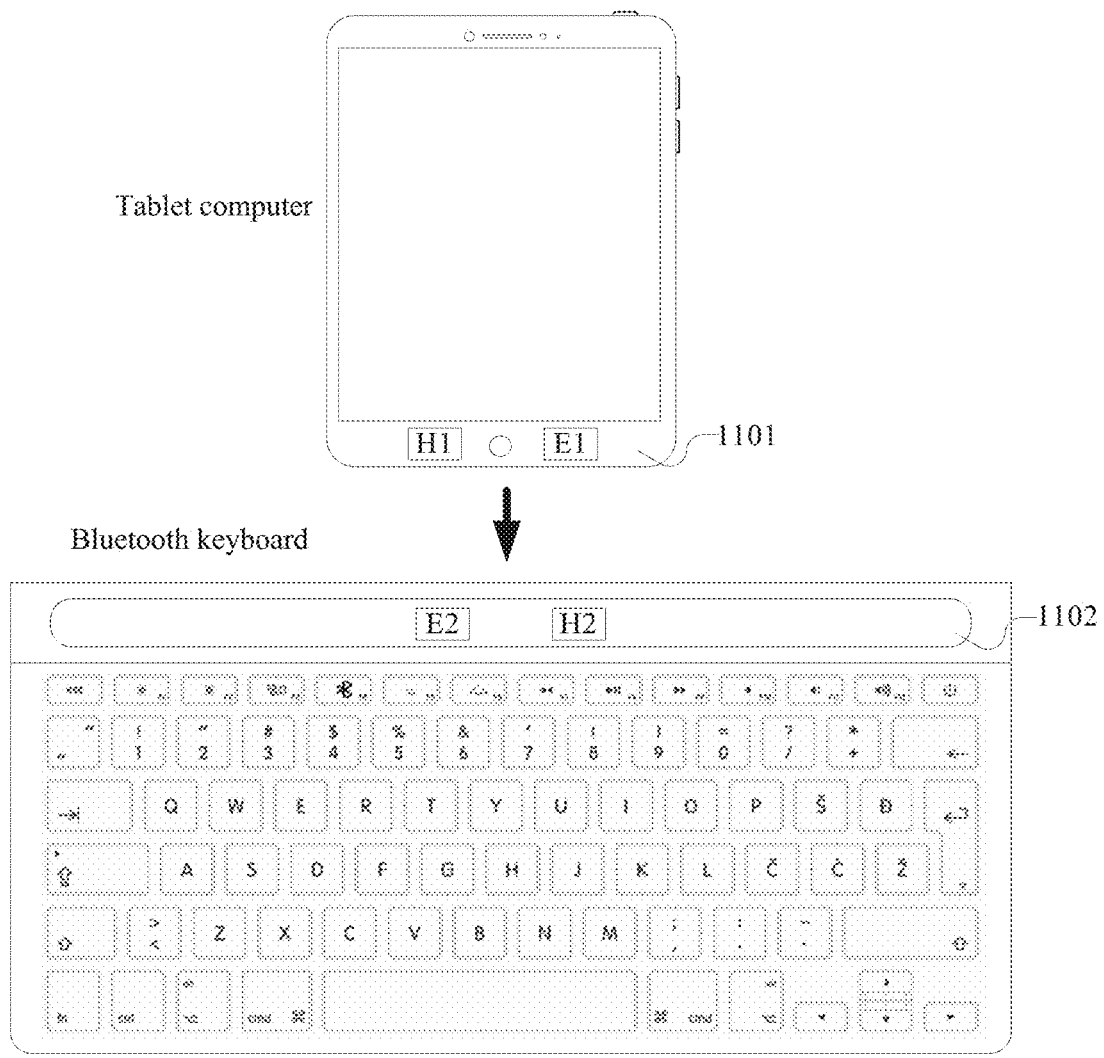
FIG. 11 is a first schematic diagram of a connection between a terminal device and an externally-connected device according to an embodiment of this application.

The pairing position is a connection point between the tablet computer and the Bluetooth keyboard or a position close to the connection point. For example, as shown in FIG. 11, a Hall sensor H1 and a magnet E1 may be disposed on any side of the tablet computer (for example, an upper side, a lower side, a left side, or a right side of the tablet computer, and an example in which the Hall sensor H1 and the magnet E1 are disposed on the lower side 1101 of the tablet computer is shown in FIG. 11). For the Bluetooth keyboard, a card slot 1102 may be disposed on the Bluetooth keyboard, and a Hall sensor H2 and a magnet E2 may be disposed in the card slot 1102.

It should be noted that both the Hall sensor and the magnet are disposed inside a device. FIG. 1I only shows positions of disposing the Hall sensors and the magnets inside the tablet computer and the Bluetooth keyboard, and is not used to indicate that these devices are disposed on surfaces of the devices.

During disposing a "Hall device-magnet" device pair in a device (the tablet computer and the Bluetooth keyboard), a distance between a Hall sensor and a magnet that are disposed in the device may be greater than a given value (for example, 5 cm). This value is determined by magnetic field strength generated by the magnet, to ensure that the Hall sensor in the device cannot detect the magnet in the device.

S1001. When the Hall sensor H1 of the tablet computer detects a magnet induction event, the Hall sensor H1 of the tablet computer reports a Hall event to a processor of the tablet computer.

Figure 12:
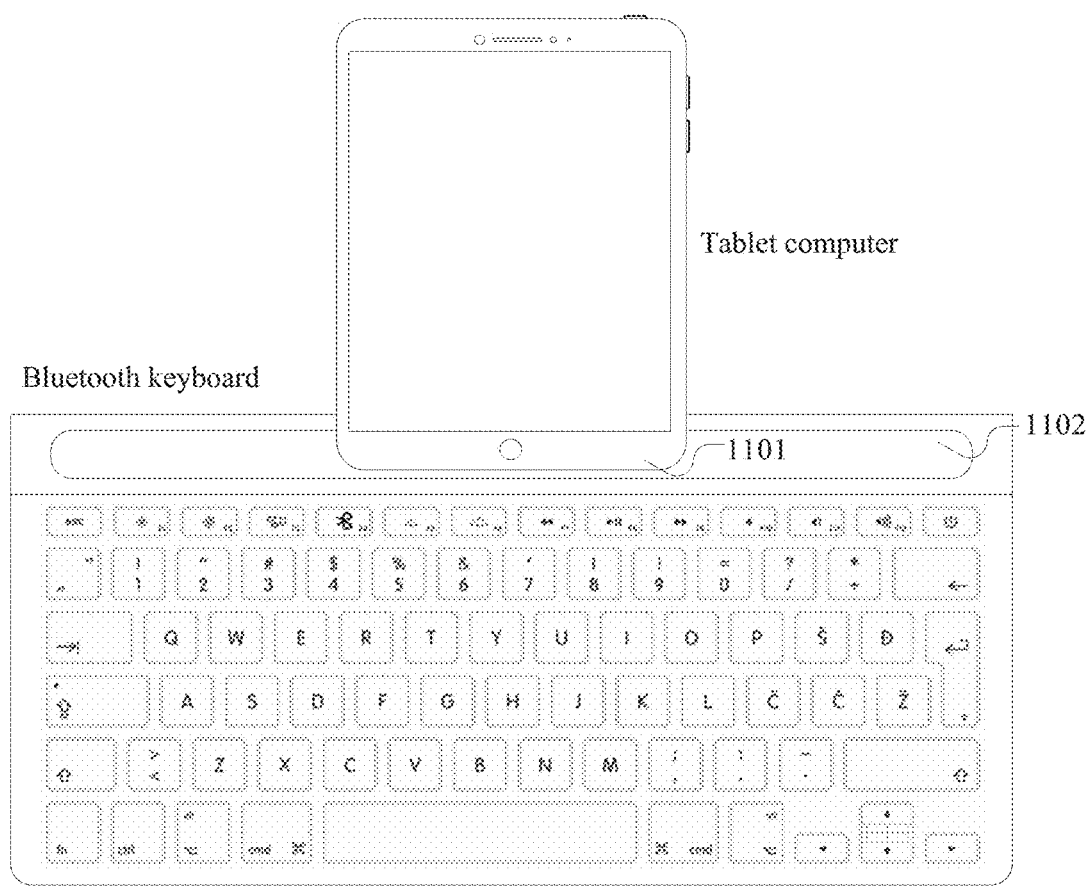
FIG. 12 is a second schematic diagram of a connection between a terminal device and an externally-connected device according to an embodiment of this application.

When needing to enter a character by using the Bluetooth keyboard and the tablet computer, a user may place the tablet computer and the Bluetooth keyboard within a given distance range. For example, as shown in FIG. 12, the user makes the lower side 1101 of the tablet computer wedged (or attracted) into the card slot 1102 of the Bluetooth keyboard. In this case, the Hall sensor H1 of the tablet computer may sense approaching of the magnet E2 of the Bluetooth keyboard, in other words, the Hall sensor H1 of the tablet computer detects the magnet induction event. The Hall sensor H1 of the tablet computer may report the Hall event to the processor of the tablet computer.

Figure 12A:
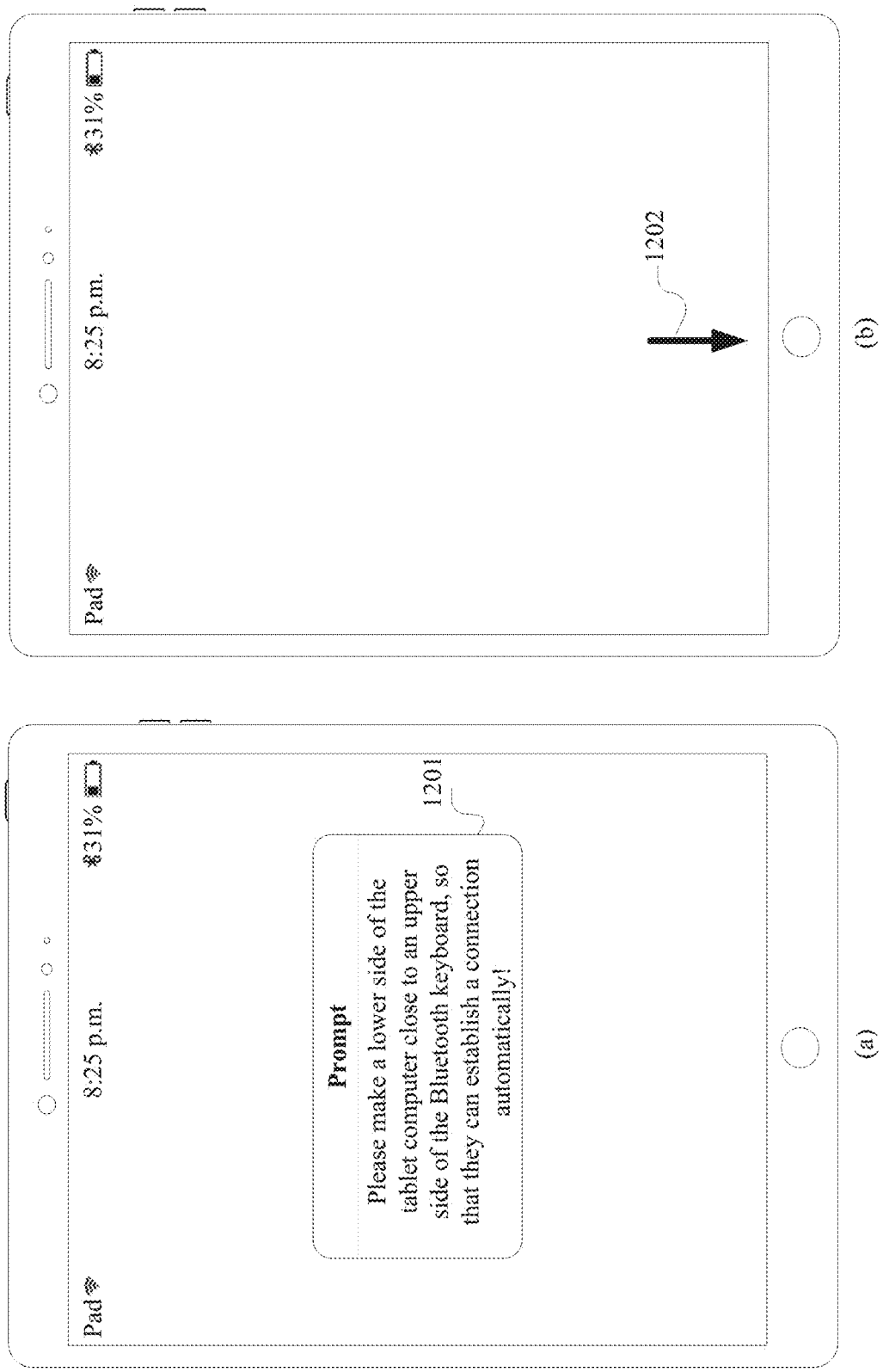
FIG. 12A is a fourth schematic diagram of a display interface of a device according to an embodiment of this application.

In addition, if no card slot is disposed in the Bluetooth keyboard and no obvious mark is set to prompt the user that the "Hall device-magnet" device pair is disposed on which one of the upper side, the lower side, the left side, and the right side of the tablet computer, in this case, as shown in (a) of FIG. 12A, a prompt window 1201 may be displayed on the tablet computer, and is configured to prompt the user to make the lower side of the tablet computer close to an upper side of the Bluetooth keyboard, to trigger the tablet computer and the Bluetooth keyboard to enter the state in which a connection can be established by using the Bluetooth protocol.

If a card slot is disposed in the Bluetooth keyboard but no obvious mark is set to prompt the user that the "Hall device-magnet" device pair is disposed on which one of the upper side, the lower side, the left side, and the right side of the tablet computer, in this case, as shown in (b) of FIG. 12A, an arrow 1202 pointing to the lower side of the tablet computer may be displayed on the tablet computer to prompt the user to make the lower side of the tablet computer close to the card slot of the Bluetooth keyboard, to trigger the tablet computer and the Bluetooth keyboard to enter the state in which a connection can be established by using the Bluetooth protocol.

Certainly, for another type of externally-connected device such as an earphone or a wristband, the manner in (a) of FIG. 12A or the manner in (b) of FIG. 12A may also be used to prompt the user to make which parts of the tablet computer and the externally-connected device close to each other, to trigger the tablet computer and the externally-connected device to enter the state in which a connection can be established by using the Bluetooth protocol.

S1002. The processor of the tablet computer controls the tablet computer to enter the state in which a connection can be established by using the Bluetooth protocol.

After the processor of the tablet computer receives the Hall event, that the processor of the tablet computer controls the tablet computer to enter the state in which a connection can be established by using the Bluetooth protocol may specifically include three possible implementations.

In a first implementation, the processor of the tablet computer controls the tablet computer to automatically turn on a Bluetooth switch, and controls the tablet computer to enter a Bluetooth scanning state.

In a second implementation, when a Bluetooth switch is turned on by default, the processor of the tablet computer controls the tablet computer to enter a Bluetooth scanning state.

In a third implementation, when a Bluetooth scanning state is enabled by default, the processor of the tablet computer controls the tablet computer to automatically turn on a Bluetooth switch.

After the tablet computer enters the state in which a connection can be established by using the Bluetooth protocol, the tablet computer may be used as a primary device, and a Bluetooth module of the tablet computer performs frequency hopping at a relatively high speed to page a secondary device.

S1003. When the Hall sensor H2 of the Bluetooth keyboard detects a magnet induction event, the Hall sensor H2 of the Bluetooth keyboard reports a Hall event to an MCU of the Bluetooth keyboard.

For example, as shown in FIG. 12, when the user makes the lower side 1101 of the tablet computer wedged (or attracted) into the card slot 1102 of the Bluetooth keyboard, the Hall sensor H2 of the Bluetooth keyboard may sense approaching of the magnet E1 of the tablet computer, in other words, the Hall sensor H2 of the Bluetooth keyboard detects the magnet induction event. In this case, the Hall sensor H2 of the Bluetooth keyboard may report the Hall event to the MCU of the Bluetooth keyboard.

S1004. The MCU of the Bluetooth keyboard controls the Bluetooth keyboard to enter the state in which a connection can be established by using the Bluetooth protocol.

After the MCU of the Bluetooth keyboard receives the Hall event, that the MCU of the Bluetooth keyboard controls the Bluetooth keyboard to enter the state in which a connection can be established by using the Bluetooth protocol may specifically include three possible implementations.

In a first implementation, the MCU of the Bluetooth keyboard controls the Bluetooth keyboard to automatically turn on a pairing switch, so that the Bluetooth keyboard enters a pairing mode, and controls the Bluetooth keyboard to enter a Bluetooth discoverable state.

In a second implementation, when a pairing switch is turned on by default, the MCU of the Bluetooth keyboard controls the Bluetooth keyboard to enter a Bluetooth discoverable state.

In a third implementation, when a discoverable state of the Bluetooth keyboard is enabled by default, the MCU of the Bluetooth keyboard controls the Bluetooth keyboard to automatically turn on a pairing switch.

After the Bluetooth keyboard enters the state in which a connection can be established by using the Bluetooth protocol, the Bluetooth keyboard may be used as the secondary device, performs frequency hopping at a relatively low speed, and broadcasts, to the tablet computer, a MAC address of the Bluetooth keyboard, a keyboard mark, and that a device type supported by the Bluetooth keyboard is a keyboard type. When the tablet computer and the Bluetooth keyboard are synchronized to a same hopping pattern, the tablet computer finds the Bluetooth keyboard through scanning.

It should be noted that, in this embodiment of this application, there is no execution sequence of steps S1001 and S1002 and steps S1003 and S1004. That is, steps S1001 and S1002 may be performed before steps S1003 and S1004, steps S1003 and S1004 may be performed before steps S1001 and S1002, or steps S1001 and S1002 and steps S1003 and S1004 may be performed at the same time. An execution sequence of steps S1001 and S1002 and steps S1003 and S1004 is not specifically limited herein.

In addition, in this embodiment of this application, if the tablet computer is in a dormant state before steps S1001 and S1002 are performed, in this case, when the tablet computer approaches the Bluetooth keyboard, the tablet computer may be woken up based on the Hall event, to end dormancy. Similarly, if the Bluetooth keyboard is in the dormant state before steps S1001 and S1002 are performed, when the tablet computer approaches the Bluetooth keyboard, the Bluetooth keyboard may also be woken up from dormancy.

S1005. The Bluetooth module of the tablet computer sends a pairing request to a Bluetooth module of the Bluetooth keyboard.

S1006. The Bluetooth module of the Bluetooth keyboard responds to the pairing request for the Bluetooth module of the tablet computer.

S1007. The processor of the tablet computer determines whether the Bluetooth keyboard is a security device.

When the Bluetooth keyboard is the security device, step S1008 is performed. When the Bluetooth keyboard is not the security device, step S1009 is performed.

It should be noted that the security device may be a or a type of device trusted by the user. No limitation is imposed herein.

For example, a memory of the tablet computer prestores an exclusive keyboard mark of the security device. After obtaining the keyboard mark of the Bluetooth keyboard approaching the tablet computer, the tablet computer may determine whether the obtained keyboard mark is the same as the prestored exclusive keyboard mark. If the obtained keyboard mark is the same as the exclusive keyboard mark, it indicates that the Bluetooth keyboard approaching the tablet computer is the security device. If the obtained keyboard mark is different from the exclusive keyboard mark, it indicates that the Bluetooth keyboard approaching the tablet computer is not the security device. For example, if the exclusive keyboard mark is 11-00, it indicates that a type of device whose keyboard mark is 11 (for example, 11-22 and 11-33) is the security device. If the exclusive keyboard mark is 11-22, it indicates that a type of device whose keyboard mark is 11-22 is the security device.

S1008. The Bluetooth module of the tablet computer requests a connection key from the Bluetooth module of the Bluetooth keyboard in a just works (Just works) manner.

For example, a process in which the Bluetooth module of the tablet computer requests the connection key from the Bluetooth module of the Bluetooth keyboard in the just works manner may be: The Bluetooth module of the tablet computer and the Bluetooth module of the Bluetooth keyboard perform pairing feature exchange, where the pairing feature exchange is used to exchange an input and output (Input and Output, IO) capability, out of band (Out Of Band, OOB) authentication data availability, an authentication requirement, a key size requirement, and a to-be-distributed transmission-specific key. Based on the IO capability, the OOB authentication data availability, and the authentication requirement, it is determined to request the connection key in the just works manner.

The Bluetooth module of the tablet computer generates a 128-bit random number (Mrand). The Bluetooth module of the Bluetooth keyboard generates a 128-bit random number (Srand).

The Bluetooth module of the tablet computer generates a confirmation value (Mconfirm). The Bluetooth module of the Bluetooth keyboard generates a confirmation value (Sconfirm).

The Bluetooth module of the tablet computer sends the Mconfirm to the Bluetooth module of the Bluetooth keyboard. After receiving the Mconfirm, the Bluetooth module of the Bluetooth keyboard sends the Sconfirm to the Bluetooth module of the tablet computer. After receiving the Sconfirm, the Bluetooth module of the tablet computer sends the Mrand to the Bluetooth module of the Bluetooth keyboard.

The Bluetooth module of the Bluetooth keyboard calculates an Mconfirm value based on the received Mrand. If the Mconfirm value obtained through calculation does not match the Mconfirm received from the Bluetooth module of the tablet computer, a pairing process ends. If the Mconfirm value obtained through calculation matches the Mconfirm received from the Bluetooth module of the tablet computer, the Bluetooth module of the Bluetooth keyboard sends the Srand to the Bluetooth module of the tablet computer.

The Bluetooth module of the tablet computer calculates a Sconfirm value based on the received Srand. If the Sconfirm value obtained through calculation does not match the Sconfirm received from the Bluetooth module of the Bluetooth keyboard, the pairing process ends. If the Sconfirm obtained by the Bluetooth keyboard of the tablet computer through calculation matches the Sconfirm received from the Bluetooth module of the Bluetooth keyboard, the Bluetooth module of the tablet computer calculates a short-term key (Short-term key, STK). After encryption is enabled, the STK may be used for link encryption.

It should be noted that, in this embodiment of this application, it is merely an example to explain just works as "direct work" in Chinese, and just works may alternatively be explained as another name in Chinese. No limitation is imposed herein.

S1009. The Bluetooth module of the tablet computer requests a connection key from the Bluetooth module of the Bluetooth keyboard in a connection key (Link Key) manner.

If the Bluetooth keyboard approaching the tablet computer is not the security device, the Bluetooth module of the tablet computer may request the connection key from the Bluetooth keyboard in the link key manner (Pass Entry).

For example, the Bluetooth module of the tablet computer sends a connection key request message to the Bluetooth module of the Bluetooth keyboard, and a display of the tablet computer displays a pairing code that needs to be entered by the user by using the Bluetooth keyboard. The user enters the pairing code by using the Bluetooth keyboard and presses an enter key. The Bluetooth module of the Bluetooth keyboard returns the pairing code entered by the user to the Bluetooth module of the tablet computer. After the Bluetooth module of the tablet computer receives the pairing code, the processor of the tablet computer verifies the received pairing code. If the verification succeeds, the Bluetooth keyboard completes pairing with the tablet computer. If the verification fails, the Bluetooth keyboard fails to pair with the tablet computer.

If the Bluetooth keyboard completes pairing with the tablet computer, steps S1010 to S1013 may be further performed.

S1010. The Bluetooth module of the tablet computer sends an SDP service request to the Bluetooth module of the Bluetooth keyboard.

S1011. The Bluetooth module of the Bluetooth keyboard returns a keyboard service type supported by the Bluetooth keyboard to the Bluetooth module of the tablet computer.

S1012. The Bluetooth module of the tablet computer sends a connection request to the Bluetooth module of the Bluetooth keyboard.

S1013. The Bluetooth module of the Bluetooth keyboard returns a connection confirmation to the Bluetooth module of the tablet computer.

After the foregoing steps S1001 to S1013 are performed, the tablet computer completes pairing with and connecting to the Bluetooth keyboard. In this case, the user may enter the character by using the Bluetooth keyboard and the tablet computer.

Figure 13:
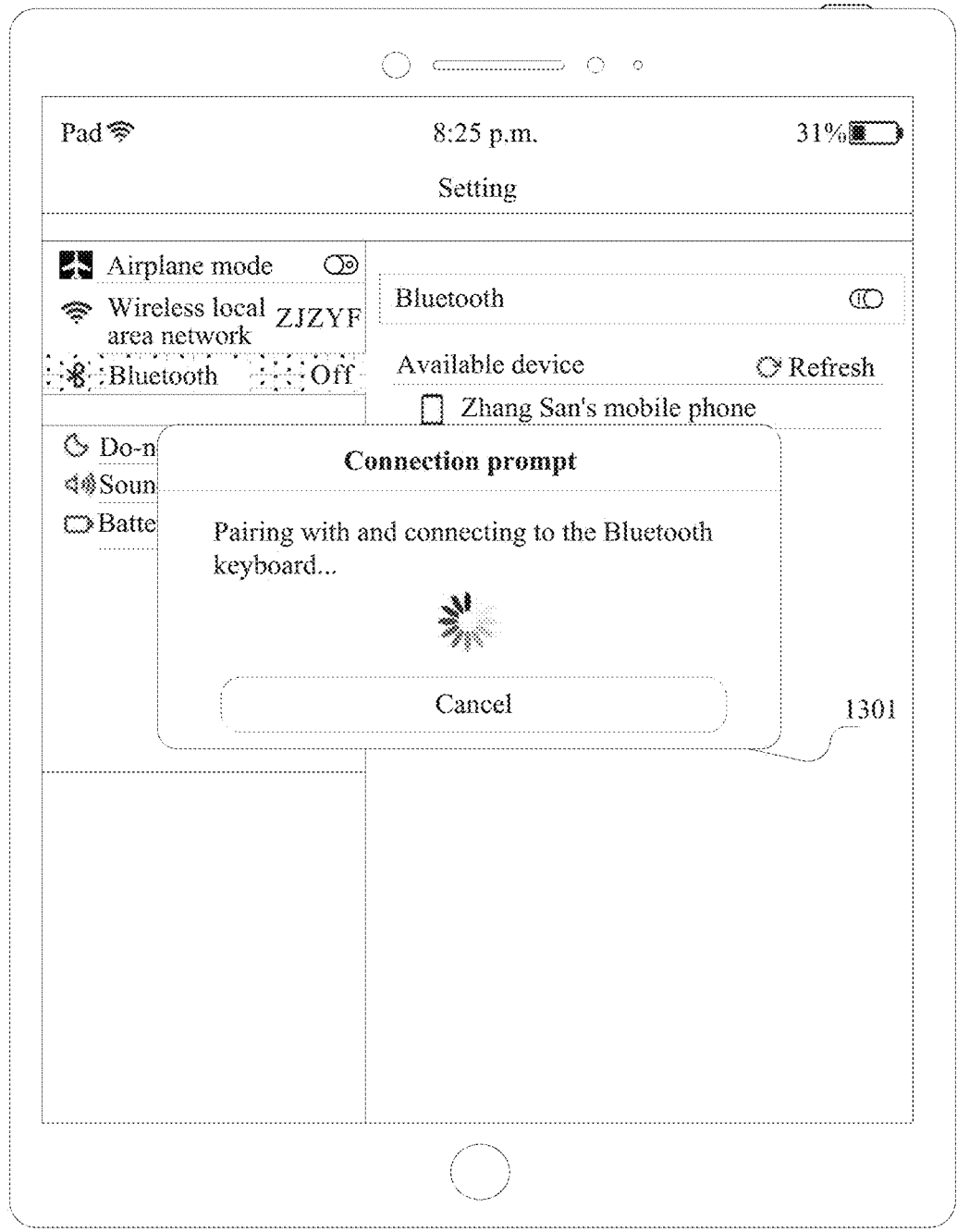
FIG. 13 is a fifth schematic diagram of a display interface of a device according to an embodiment of this application.

In a process of performing the foregoing steps S1001 to S1013, as shown in FIG. 13, the display of the tablet computer may display a connection prompt window 1301, to prompt the user that a connection is being established between the tablet computer and the Bluetooth keyboard.

Figure 14:
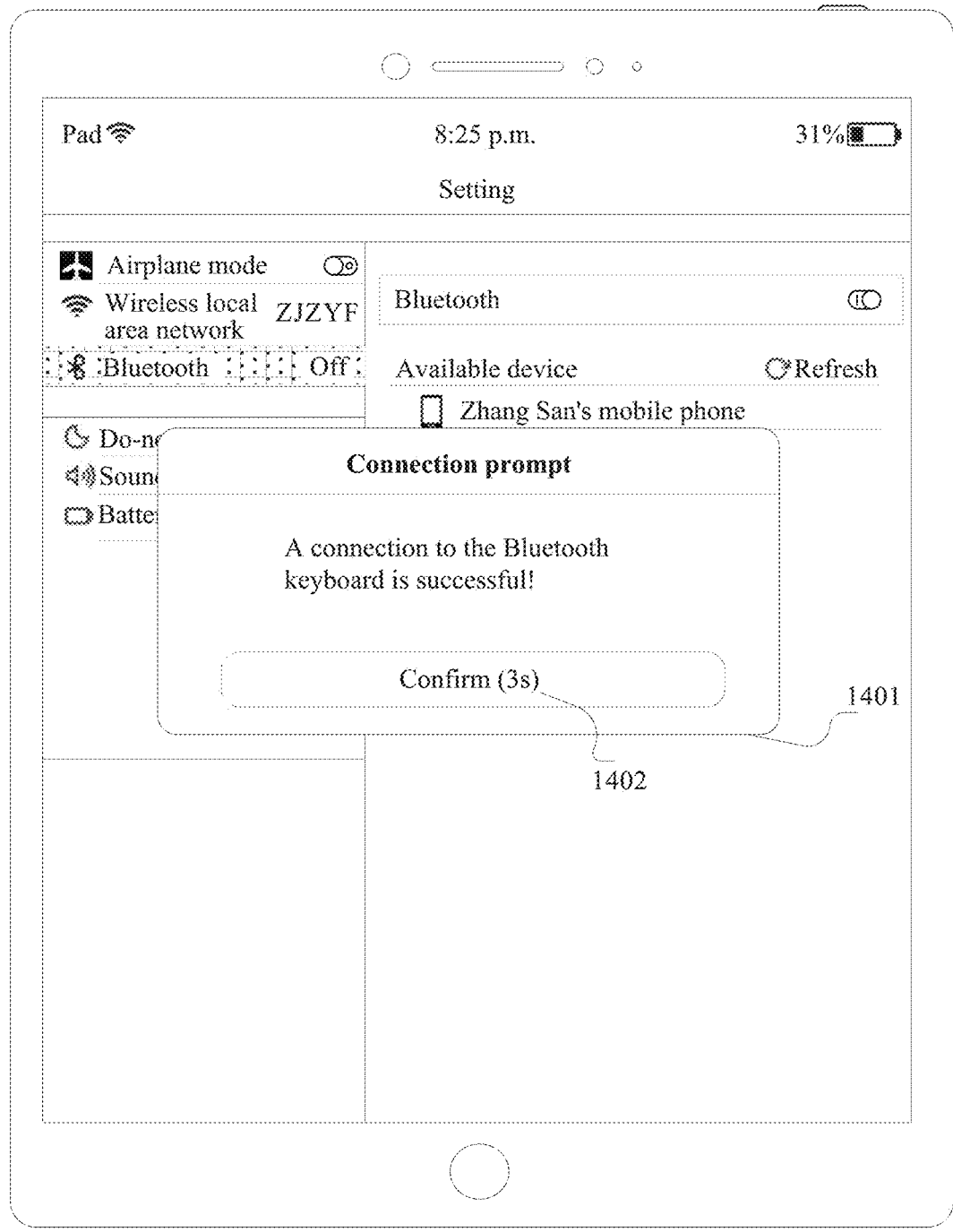
FIG. 14 is a sixth schematic diagram of a display interface of a device according to an embodiment of this application.

Further, after the steps S1001 to S1013 are performed and the tablet computer completes pairing with the Bluetooth keyboard, as shown in FIG. 14, the display of the tablet computer may display a connection success prompt window 1401, to prompt the user that the tablet computer and the Bluetooth keyboard are successfully connected. Further, optionally, as shown in FIG. 14, a countdown 1402 may be displayed in the connection success prompt window 1401, to prompt the user that the connection success prompt window 1401 will be automatically closed when the countdown ends (for example, after 3 seconds (s)).

Figure 14A:
FIG. 14A is a seventh schematic diagram of a display interface of a device according to an embodiment of this application.
Figure 14A:
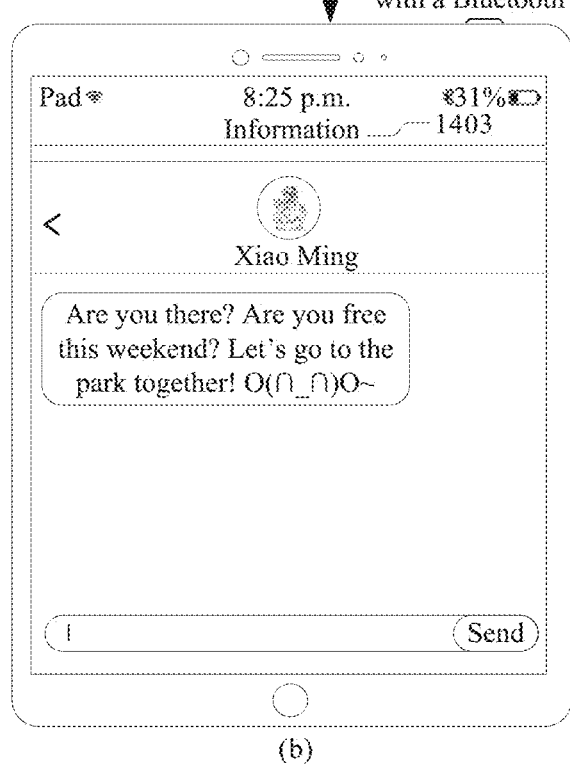

As shown in (a) of FIG. 14A, if the tablet computer displays an information and chat interface 1403 and a soft keyboard 1404 before the foregoing steps S1001 to S1013 are performed, after the steps S1001 to S1013 are performed and the tablet computer completes pairing with the Bluetooth keyboard, the tablet computer automatically hides the soft keyboard and only displays the information and chat interface 1403, as shown in (b) of FIG. 14A.

Figure 14B:
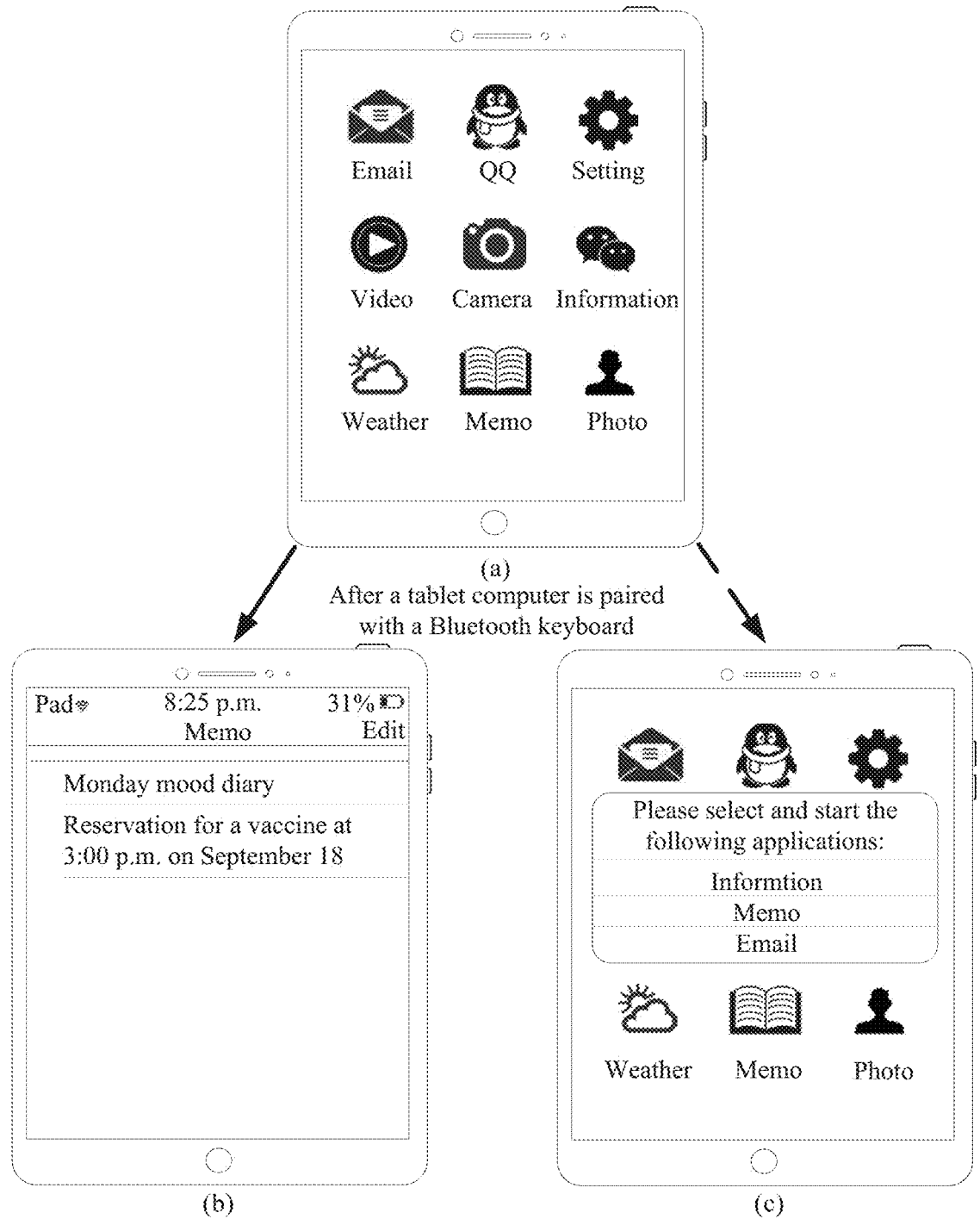
FIG. 14B is an eighth schematic diagram of a display interface of a device according to an embodiment of this application.

As shown in (a) of FIG. 14B, if the tablet computer displays a home screen before the foregoing steps S1001 to S1013 are performed, after the steps S1001 to S1013 are performed and the tablet computer completes pairing with the Bluetooth keyboard, the tablet computer automatically starts a memo application, as shown in (b) of FIG. 14B, or the tablet computer displays an application list for the user to choose, so as to enter the character by using the Bluetooth keyboard, as shown in (c) of FIG. 14B, where the application list includes information, a memo, and an email.

Figure 15:
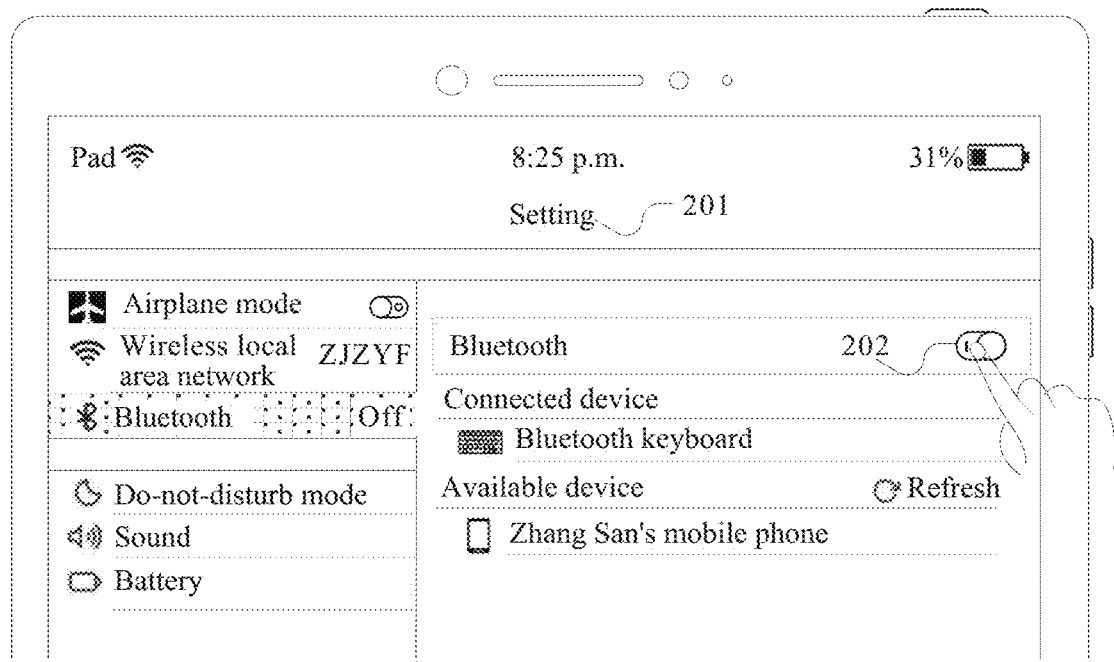
FIG. 15 is a ninth schematic diagram of a display interface of a device according to an embodiment of this application.

In addition, after entering the character by using the Bluetooth keyboard, the user may break the connection between the tablet computer and the Bluetooth keyboard. Usually, the connection between the tablet computer and the Bluetooth keyboard may be broken in the following several manners:

In a first manner, as shown in FIG. 15, the user turns off the Bluetooth switch 202 of the tablet computer on a setting interface 201 of the tablet computer.

Figure 16:
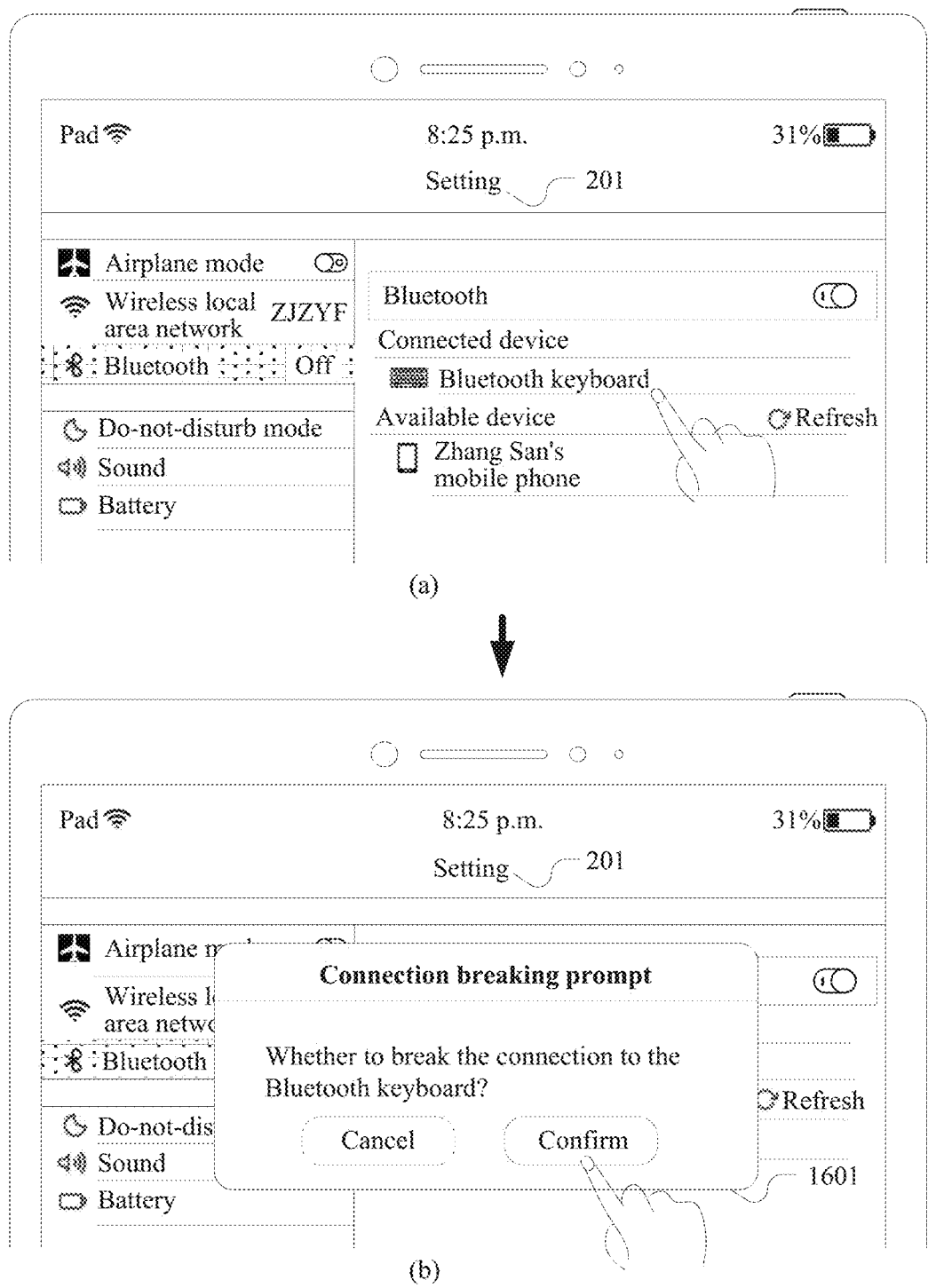
FIG. 16 is a tenth schematic diagram of a display interface of a device according to an embodiment of this application.

In a second manner, as shown in (a) of FIG. 16, the user taps, on a setting interface 201 of the tablet computer, a name of a connected externally-connected device to be disconnected, namely, a name "Bluetooth keyboard". In this case, as shown in (b) of FIG. 16, the tablet computer displays a prompt window 1601, to ask whether the user needs to break the connection to the Bluetooth keyboard. The user taps a "Confirm" key 1602.

Figure 17:
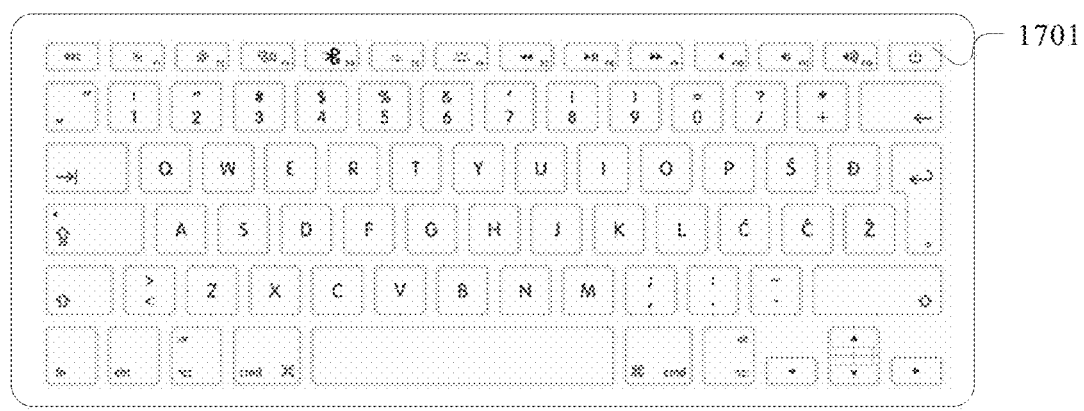
FIG. 17 is a third schematic diagram of an operation according to an embodiment of this application.

In a third manner, as shown in FIG. 17, the user turns off a power switch 1701 of the Bluetooth keyboard.

Figure 17A:
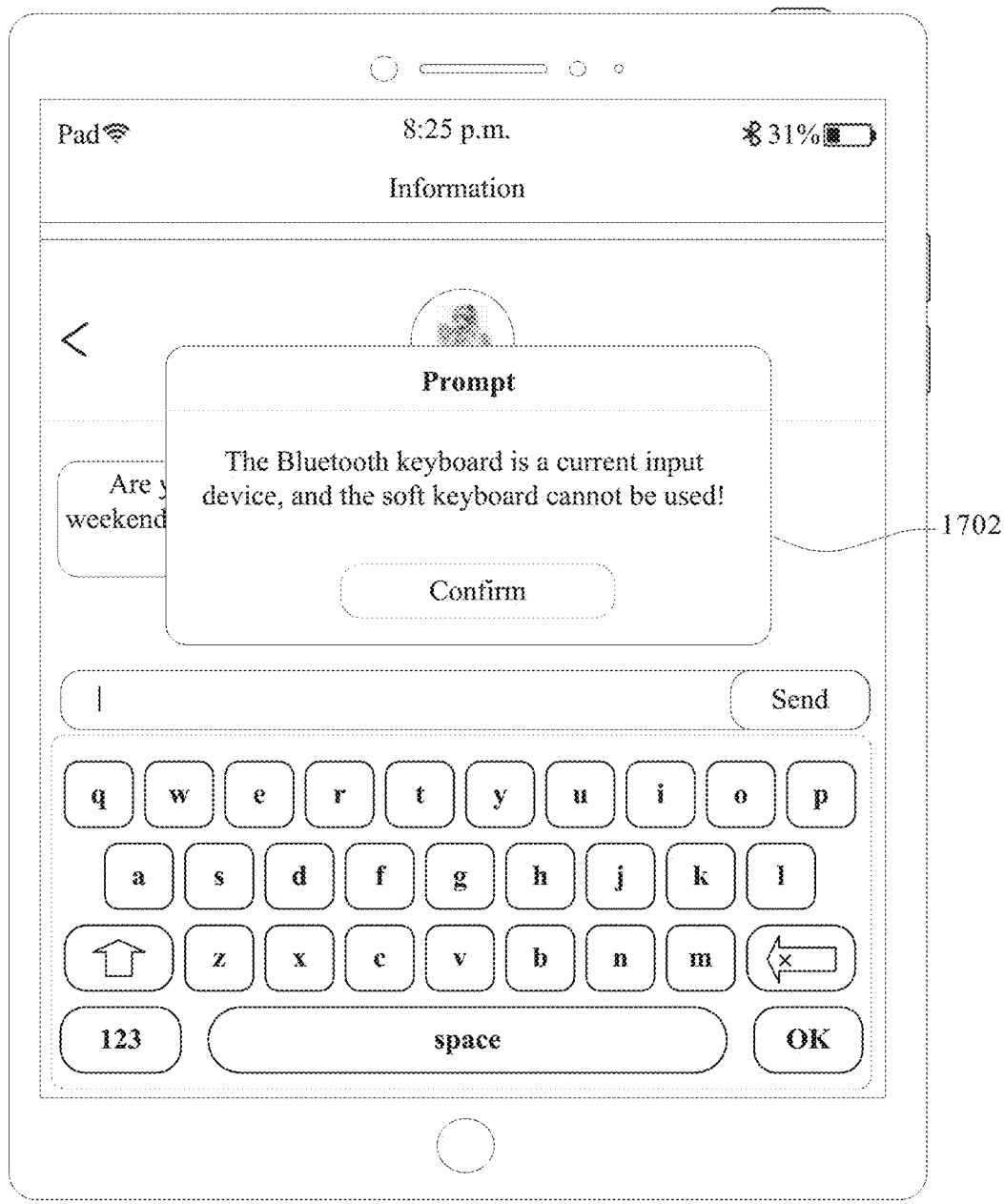
FIG. 17A is an eleventh schematic diagram of a display interface of a device according to an embodiment of this application.

It can be learned that after entering the character by using the keyboard, the user needs to perform some operations to break the connection between the tablet computer and the Bluetooth keyboard. If the user forgets to break the connection between the tablet computer and the Bluetooth keyboard, when a distance between the tablet computer and the Bluetooth keyboard is within 10 m, the Bluetooth connection always remains. In this case, if the user wants to enter a character by using the soft keyboard on the tablet computer, the soft keyboard cannot be displayed because the Bluetooth keyboard is a current input device. Alternatively, the soft keyboard is displayed but cannot be used because the Bluetooth keyboard is a current input device. For example, as shown in FIG. 17A, after the soft keyboard is displayed, prompt information 1702 is displayed, to prompt the user that the Bluetooth keyboard is the current input device and the soft keyboard cannot be used. Moreover, an unplugging and disconnection effect cannot be achieved.

Figure 18:
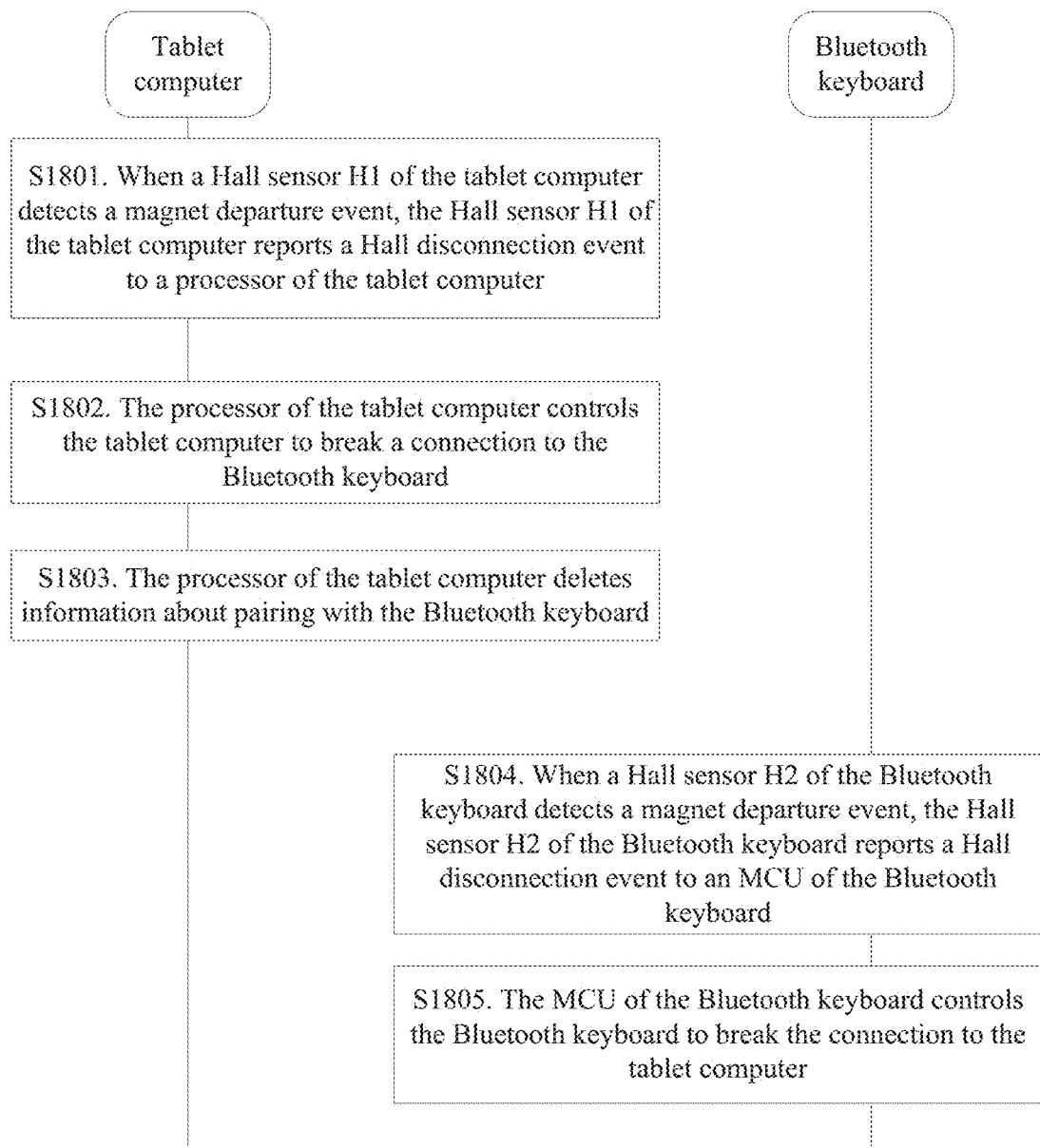
FIG. 18 is a schematic flowchart of an unpairing method according to an embodiment of this application.

To avoid that the soft keyboard cannot be displayed or is displayed but cannot be used because the user forgets to break the connection and the Bluetooth keyboard is the current input device, and achieve the unplugging and disconnection effect, further, as shown in FIG. 18, an embodiment of this application provides an unpairing method. The method may include the following steps S1801 to S1805.

S1801. When a Hall sensor H1 of a tablet computer detects a magnet departure event, the Hall sensor H1 of the tablet computer reports a Hall disconnection event to a processor of the tablet computer.

After completing input by using a Bluetooth keyboard, a user may disconnect the tablet computer from the Bluetooth keyboard. For example, the user removes the tablet computer from a card slot of the Bluetooth keyboard. In this case, the Hall sensor H1 of the tablet computer may sense departure of a magnet E2 of the Bluetooth keyboard, in other words, the Hall sensor H1 of the tablet computer detects the magnet departure event. The Hall sensor H1 of the tablet computer may report the Hall disconnection event to the processor of the tablet computer.

S1802. The processor of the tablet computer controls the tablet computer to break a connection to the Bluetooth keyboard.

Figure 18A:
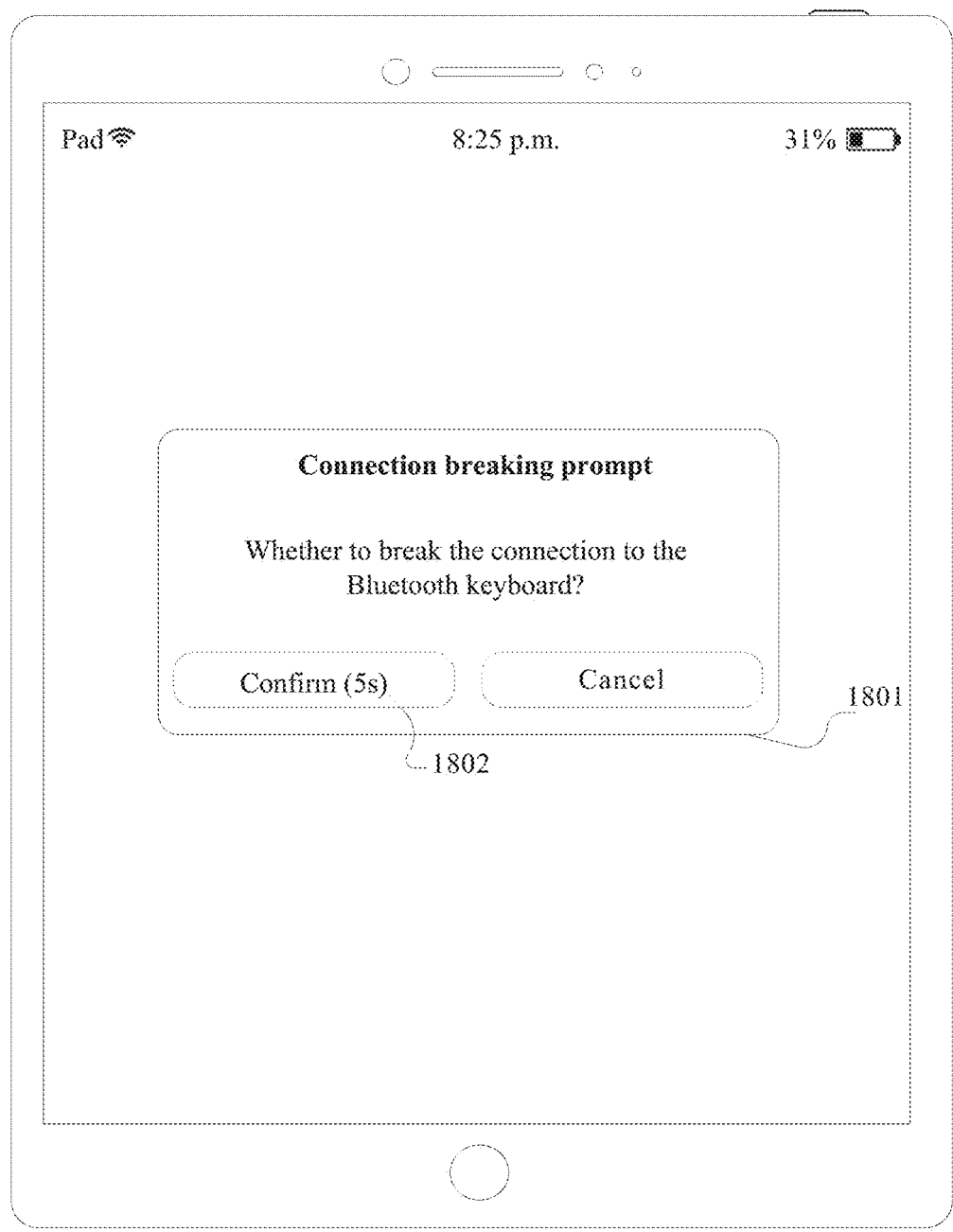
FIG. 18A is a twelfth schematic diagram of a display interface of a device according to an embodiment of this application.

Optionally, in this embodiment of this application, before the processor of the tablet computer controls the tablet computer to break the connection to the Bluetooth keyboard, as shown in FIG. 18A, a prompt window 1801 may be displayed, to ask whether the user needs to break the connection between the tablet computer and the Bluetooth keyboard. Further, optionally, a countdown 1802 may be displayed in a "Confirm" key in the prompt window 1801, to prompt the user that it is defaulted that the user chooses to break the connection between the tablet computer and the Bluetooth keyboard when the countdown ends (for example, after 5 seconds).

S1803. The processor of the tablet computer deletes information about pairing with the Bluetooth keyboard.

The information about pairing with the Bluetooth keyboard may include a MAC address of the Bluetooth keyboard, a connection key, a service type of the Bluetooth keyboard, and the like.

S1804. When a Hall sensor H2 of the Bluetooth keyboard detects a magnet departure event, the Hall sensor H2 of the Bluetooth keyboard reports a Hall disconnection event to an MCU of the Bluetooth keyboard.

For example, when the user removes the tablet computer from the card slot of the Bluetooth keyboard, the Hall sensor H2 of the Bluetooth keyboard may sense departure of a magnet E1 of the tablet computer, in other words, the Hall sensor H2 of the Bluetooth keyboard detects the magnet departure event. The Hall sensor H2 of the Bluetooth keyboard may report the Hall disconnection event to the MCU of the Bluetooth keyboard.

S1805. The MCU of the Bluetooth keyboard controls the Bluetooth keyboard to break the connection to the tablet computer.

Figure 19:
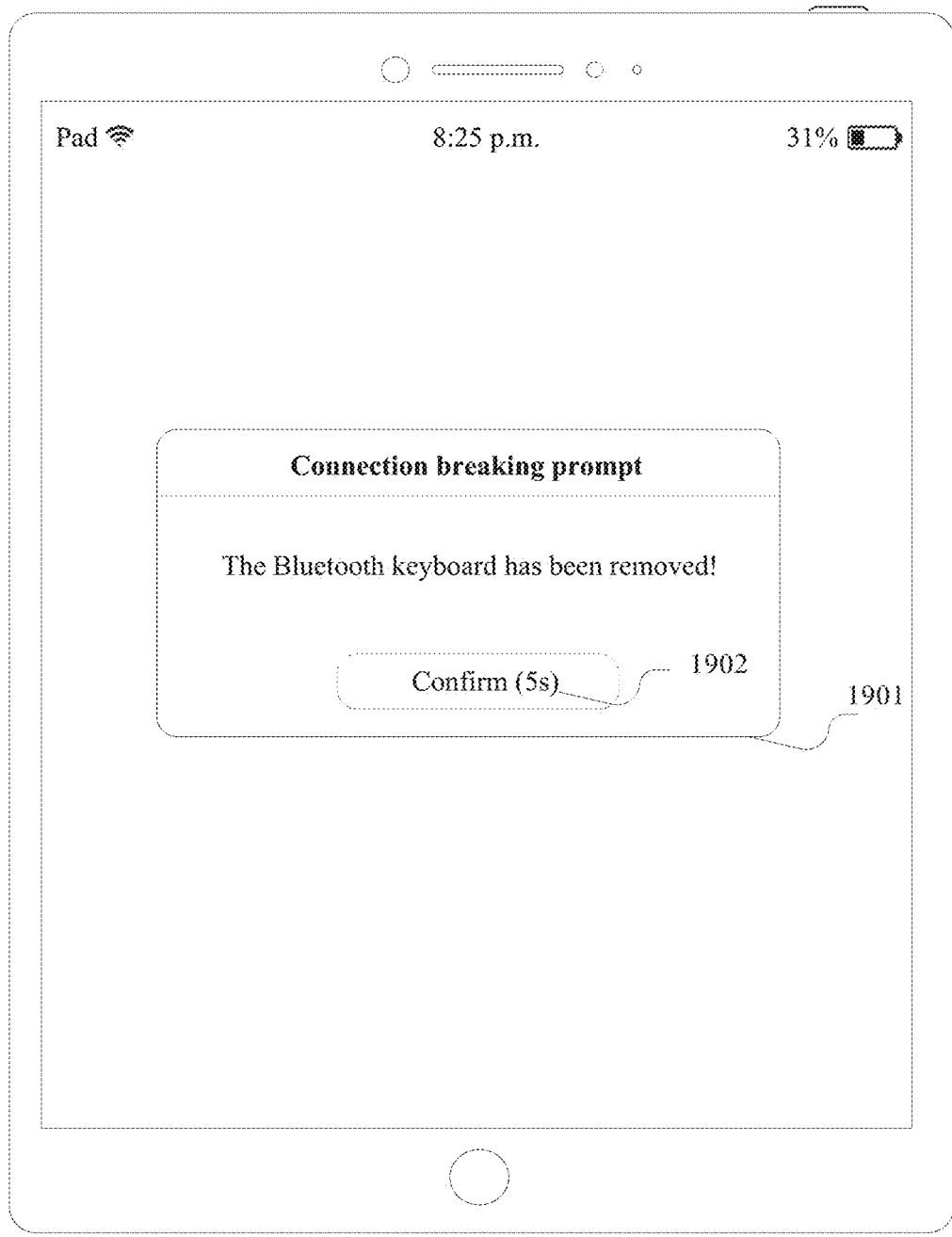
FIG. 19 is a thirteenth schematic diagram of a display interface of a device according to an embodiment of this application.

After the Bluetooth keyboard breaks the connection to the tablet computer, as shown FIG. 19, the tablet computer may display a connection breaking success prompt window 1901, to prompt the user that the connection between the tablet computer and the Bluetooth keyboard has been successfully broken. Further, optionally, as shown in FIG. 19, a countdown 1902 may be displayed in the connection breaking success prompt window 1901, to prompt the user that the connection breaking success prompt window 1901 will be automatically closed when the countdown ends (for example, after 5 seconds).

It should be noted that, in the unpairing method, the connection between the Bluetooth keyboard and the tablet computer can be broken by performing only steps S1801 to S1803 or only steps S1804 and S1805.

In this embodiment of this application, to simplify a processing procedure when the Bluetooth keyboard and the tablet computer are re-connected, after the user completes input by using the Bluetooth keyboard, step S1803 may not be performed in a process of breaking the connection between the Bluetooth keyboard and the tablet computer, and only the connection between the Bluetooth keyboard and the tablet computer is broken. In this way, when the tablet computer and the Bluetooth keyboard need to be re-connected, the tablet computer can pair with and connect to the Bluetooth keyboard by performing only steps S1001 to S1004.

The pairing information does not need to be cleared. In breaking the connection between the Bluetooth keyboard and the tablet computer, a software action "breaking a connection" in step S1802 may be replaced by "closing a HID profile (HID Profile)", to achieve a purpose of disabling reception of input from the Bluetooth keyboard while not clearing the pairing information. Moreover, after the tablet computer and the Bluetooth keyboard approach each other again, pairing and connection can be completed without performing re-pairing.

Further, optionally, after the Bluetooth keyboard establishes the connection to the tablet computer, the tablet computer may add a mark of the Bluetooth keyboard, for example, the MAC address, to a trust list. When a device in the trust list needs to re-connect to the tablet computer, the device may request a connection key directly in a just works manner (even if the device is not a security device). Alternatively, when a device in the trust list needs to re-connect to the tablet computer, the device can directly establish a connection to the tablet computer and no re-pairing needs to be performed. In other words, the device in the trust list may establish the connection to the tablet computer in a different authentication manner or by using a different encryption level, to simplify a connection process.

It should be noted that only the process in which the tablet computer pairs with and connects to the Bluetooth keyboard is specifically described in the foregoing embodiments of this application. The pairing method provided in the embodiments of this application may also be applied to another application scenario, and a specific implementation process is similar to the foregoing implementation process.

For example, in a first scenario, it is assumed that a terminal device is a mobile phone and serves as a primary device, and an externally-connected device is a printer and serves as a secondary device. In addition, it is assumed that a Bluetooth switch of the mobile phone is turned on by default, a pairing switch of the printer is also turned on by default, and the mobile phone and the printer establish a connection by using a Bluetooth protocol.

Figure 20:
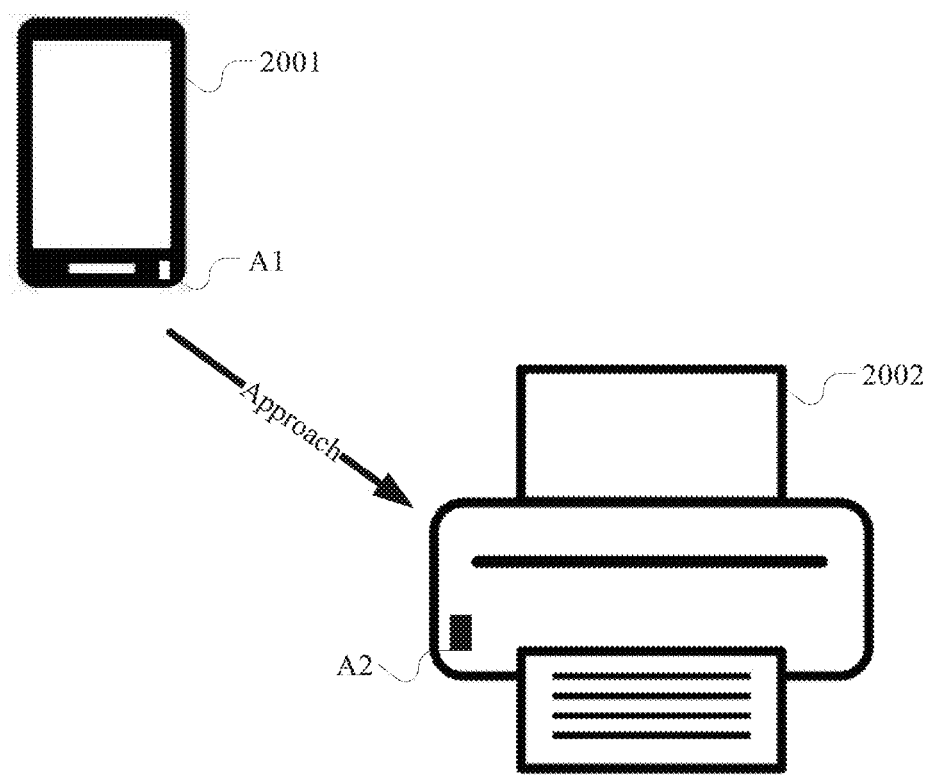
FIG. 20 is a first schematic diagram of an application scenario according to an embodiment of this application.

As shown in FIG. 20, a proximity sensor A1 is disposed in a mobile phone 2001 in advance, and a proximity sensor A2 is also disposed in a printer 2002 in advance. When the proximity sensor A1 in the mobile phone 2001 detects approaching of an object, the mobile phone 2001 enters a Bluetooth scanning state. When the proximity sensor A2 in the printer 2002 detects approaching of an object, the printer 2002 enters a discoverable state. When the mobile phone 2001 finds the printer 2002 through search, the mobile phone 2001 pairs with and connects to the printer 2002.

After the successful connection, the mobile phone 2001 may use the printer 2002 for printing. After completing printing, a user may take the mobile phone 2001 away from the printer 2002. In this case, the mobile phone 2001 and the printer 2002 are automatically disconnected.

In a second scenario, it is assumed that a terminal device is a mobile phone and serves as a primary device, and an externally-connected device is a vehicle-mounted computer and serves as a secondary device. In addition, it is assumed that a Bluetooth switch of the mobile phone is turned on by default, a pairing switch of the vehicle-mounted computer is also turned on by default, and the mobile phone and the vehicle-mounted computer establish a connection by using a Bluetooth protocol.

Figure 21:
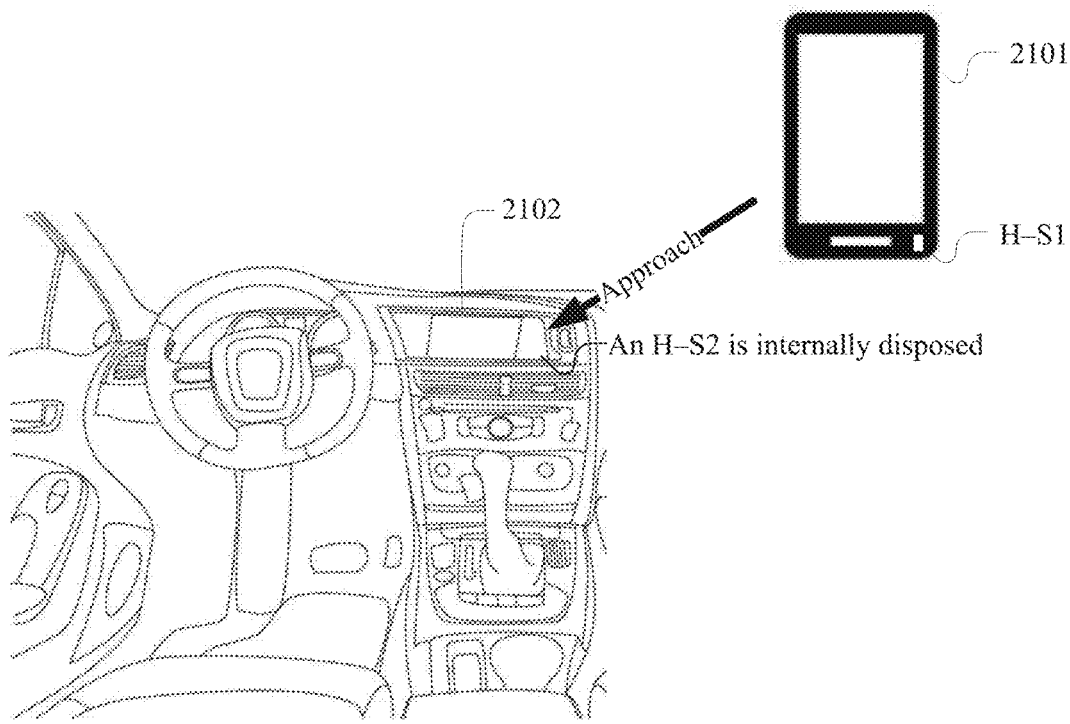
FIG. 21 is a second schematic diagram of an application scenario according to an embodiment of this application.

As shown in FIG. 21, a "Hall device-magnet" device pair H-S1 is disposed in a mobile phone 2101 in advance, and a "Hall device-magnet" device pair H-S2 is also disposed in a vehicle-mounted computer 2102 in advance. When a Hall sensor in the mobile phone 2101 detects approaching of a magnet, the mobile phone 2101 enters a Bluetooth scanning state. When a Hall sensor of the vehicle-mounted computer 2102 detects approaching of a magnet, the vehicle-mounted computer 2102 enters a discoverable state.

When the mobile phone 2101 finds the vehicle-mounted computer 2102 through search, the mobile phone 2001 pairs with and connects to the vehicle-mounted computer 2102. After the successful connection, the mobile phone 2101 may play music in the mobile phone, make a call, or the like by using the vehicle-mounted computer 2102.

After a user leaves a car, the mobile phone 2101 and the vehicle-mounted computer 2102 are automatically disconnected.

Certainly, the terminal device and the externally-connected device may alternatively be triggered by using another means, to automatically establish the connection, and the connection may be established by using another wireless communication protocol such as a Wi-Fi protocol or a ZigBee protocol. An implementation process of automatic connection and automatic connection cancellation is similar to the foregoing implementation process. Details are not described herein again.

According to the pairing method provided in this embodiment of this application, the tablet computer automatically enters a to-be-connected state based on the Hall event generated by the Hall device, and sends a trigger signal to trigger the Bluetooth keyboard to also automatically enter the to-be-connected state, so that the tablet computer establishes the connection to the Bluetooth keyboard by using a wireless communication protocol. This resolves a problem that processes in which the tablet computer pairs with and connects to the Bluetooth keyboard are relatively complex and are inconvenient for the user to use.

Moreover, when the Bluetooth keyboard requesting to connect to the tablet computer is the security device, the tablet computer requests the connection key from the Bluetooth keyboard in the just works manner. This prevents the user from manually entering the pairing code, further simplifies a pairing and connection process, and implements plug and play.

After the user no longer uses the Bluetooth keyboard, the tablet computer automatically breaks the connection to the Bluetooth keyboard based on the Hall disconnection event generated by the Hall device. This avoids that the soft keyboard cannot be displayed or is displayed but cannot be used because the user forgets to break the connection and the Bluetooth keyboard is the current input device, and achieves an unplugging and disconnection effect.

Figure 22:
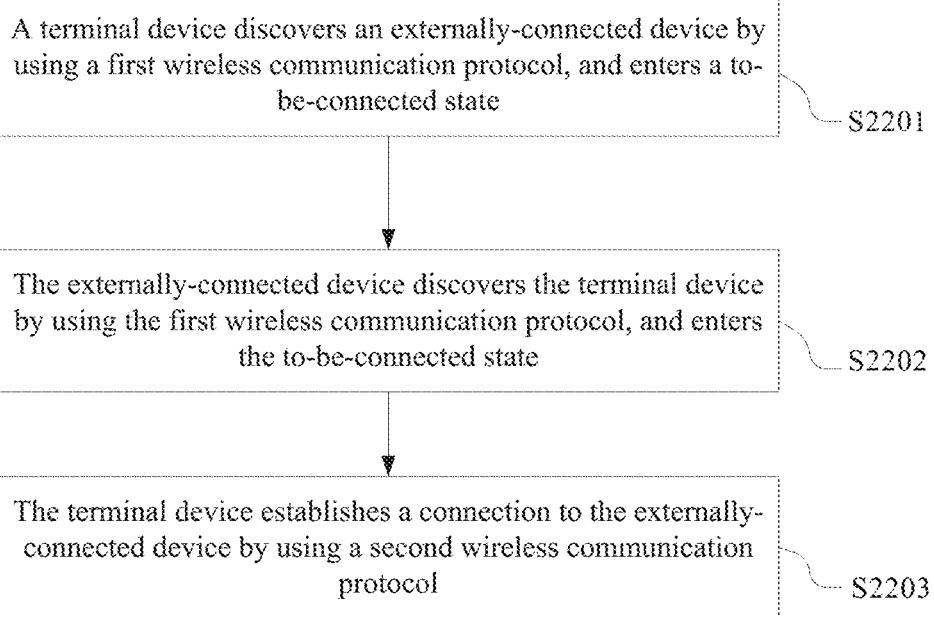
FIG. 22 is a schematic flowchart of another pairing method according to an embodiment of this application.

FIG. 22 is a flowchart of another pairing method according to an embodiment of this application. As shown in FIG. 22, the method may include the following steps.

S2201. A terminal device discovers an externally-connected device by using a first wireless communication protocol, and enters a to-be-connected state.

The to-be-connected state is a state in which the terminal device can establish a connection to the externally-connected device by using a second wireless communication protocol. A signal coverage area of the first wireless communication protocol is different from a signal coverage area of the second wireless communication protocol. For example, the signal coverage area of the first wireless communication protocol is greater than the signal coverage area of the second wireless communication protocol, or the signal coverage area of the first wireless communication protocol is less than the signal coverage area of the second wireless communication protocol.

For example, if the first wireless communication protocol is a Wi-Fi protocol, and the second wireless communication protocol is a Bluetooth protocol, when the terminal device and the externally-connected device are in a signal coverage area of the Wi-Fi protocol, the terminal device may discover the externally-connected device by using the Wi-Fi protocol, and enter the to-be-connected state.

S2202. The externally-connected device discovers the terminal device by using the first wireless communication protocol, and enters the to-be-connected state.

For example, if the first wireless communication protocol is a Wi-Fi protocol, and the second wireless communication protocol is a Bluetooth protocol, when the terminal device and the externally-connected device are in a signal coverage area of the Wi-Fi protocol, the externally-connected device may discover the terminal device by using the Wi-Fi protocol, and enter the to-be-connected state.

S2203. The terminal device establishes the connection to the externally-connected device by using the second wireless communication protocol, and vice versa.

For example, after both the terminal device and the externally-connected device enter the to-be-connected state, the terminal device may establish the connection to the externally-connected device by using the Bluetooth protocol.

According to the pairing method provided in this embodiment of this application, both the terminal device and the externally-connected device discover each other by using the first wireless communication protocol, and enter the to-be-connected state; and the terminal device and the externally-connected device establish the connection by using the second wireless communication protocol. This resolves a problem that processes in which the terminal device pairs with and connects to the externally-connected device are relatively complex and are inconvenient for a user to use, and further implements plug and play in a case of password-free authentication. In addition, the second wireless communication protocol does not need to keep always enabled, reducing power consumption of the terminal.

The foregoing mainly describes, in terms of interaction between various devices, the solutions provided in the embodiments of this application. It may be understood that, to implement the foregoing functions, the terminal device and the externally-connected device include corresponding hardware structures and/or software modules for performing the functions. A person skilled in the art should easily be aware that, algorithm steps of the examples described with reference to the embodiments disclosed in this specification may be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the terminal device and the externally-connected device may be divided into functional modules according to the foregoing method example. For example, various functional modules corresponding to various functions may be obtained through division, or two or more functions may be integrated into one processing module. The integrated module may be implemented in a form of hardware, or may be implemented in a form of a software functional module. It should be noted that, in the embodiments of this application, module division is an example, and is merely logical function division. In actual implementation, another division manner may be used.

Figure 23:
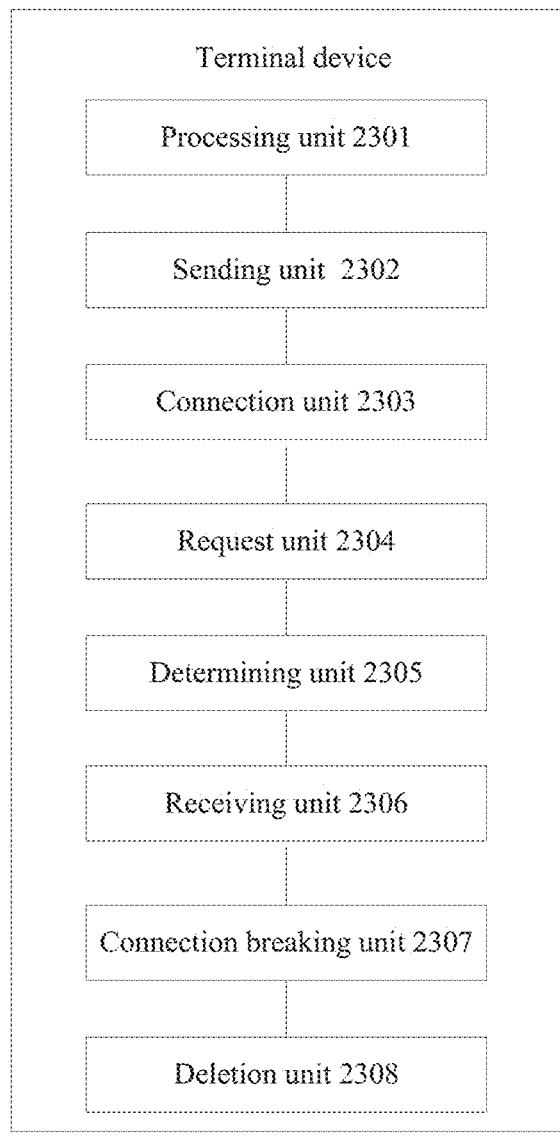
FIG. 23 is a schematic composition diagram of a terminal device according to an embodiment of this application.

When various functional modules corresponding to various functions are obtained through division, FIG. 23 is a possible schematic composition diagram of a terminal device in the foregoing embodiments. The terminal device includes a Hall device, or the terminal device connects to a Hall device. As shown in FIG. 23, the terminal device may include a processing unit 2301, a sending unit 2302, and a connection unit 2303.

The processing unit 2301 is configured to support the terminal device in performing step S901 in the pairing method shown in FIG. 9, support the terminal device in performing steps S1001 and S1002 in the pairing method shown in FIG. 10, and support the terminal device in performing step S1801 in the unpairing method shown in FIG. 18.

The sending unit 2302 is configured to support the terminal device in performing step S902 in the pairing method shown in FIG. 9, and support the terminal device in performing step S1005 in the pairing method shown in FIG. 10.

The connection unit 2303 is configured to support the terminal device in performing step S903 in the pairing method shown in FIG. 9, and support the terminal device in performing steps S1010, S1011, S1012, and S1013 in the pairing method shown in FIG. 10.

In this embodiment of this application, further, as shown in FIG. 23, the terminal device may further include a request unit 2304.

The request unit 2304 is configured to support the terminal device in performing steps S1008 and S1009 in the pairing method shown in FIG. 9.

In this embodiment of this application, further, as shown in FIG. 23, the terminal device may further include a determining unit 2305.

The determining unit 2305 is configured to support the terminal device in performing step S1007 in the pairing method shown in FIG. 10.

In this embodiment of this application, further, as shown in FIG. 23, the terminal device may further include a receiving unit 2306.

The receiving unit 2306 is configured to support the terminal device in performing a receiving operation in the pairing method shown in FIG. 10.

In this embodiment of this application, further, as shown in FIG. 23, the terminal device may further include a connection breaking unit 2307.

The connection breaking unit 2307 is configured to support the terminal device in performing step S1802 in the unpairing method shown in FIG. 18.

In this embodiment of this application, further, as shown in FIG. 23, the terminal device may further include a deletion unit 2308.

The deletion unit 2308 is configured to support the terminal device in performing step S1803 in the unpairing method shown in FIG. 18.

Figure 24:
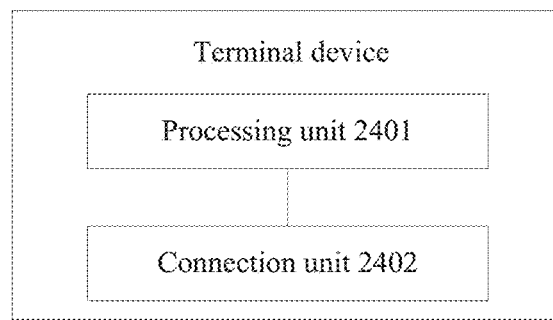
FIG. 24 is a schematic composition diagram of another terminal device according to an embodiment of this application.

When various functional modules corresponding to various functions are obtained through division, FIG. 24 is a possible schematic composition diagram of a terminal device in the foregoing embodiments. The terminal device includes a Hall device, or the terminal device connects to a Hall device. As shown in FIG. 24, the terminal device may include a processing unit 2401 and a connection unit 2402.

The processing unit 2401 is configured to support the terminal device in performing step S2201 in the pairing method shown in FIG. 22.

The connection unit 2402 is configured to support the terminal device in performing step S2203 in the pairing method shown in FIG. 22.

It should be noted that all related content of various steps in the foregoing method embodiments may be cited in function descriptions of corresponding functional modules. Details are not described herein again. The terminal device provided in this embodiment of this application is configured to perform the foregoing pairing method, and therefore can achieve a same effect as the foregoing pairing method.

When various functional modules corresponding to various functions are obtained through division, a terminal device includes a Hall device, or a terminal device connects to a Hall device. The terminal device may include a connection breaking unit. The connection breaking unit is configured to support the terminal device in performing step S1802 in the unpairing method shown in FIG. 18.

It should be noted that all related content of various steps in the foregoing method embodiments may be cited in function descriptions of corresponding functional modules. Details are not described herein again. The terminal device provided in this embodiment of this application is configured to perform the foregoing unpairing method, and therefore can achieve a same effect as the foregoing unpairing method.

Figure 25:
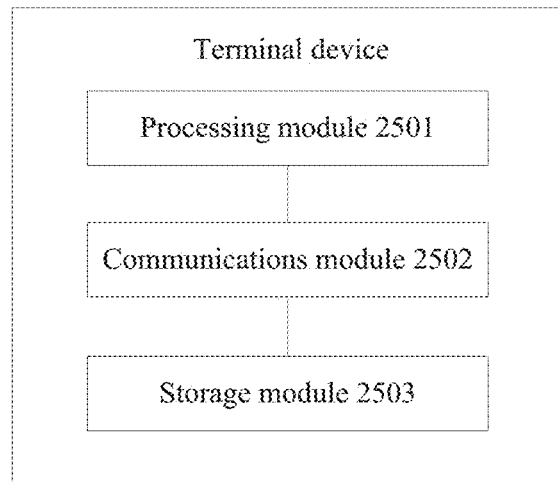
FIG. 25 is a schematic composition diagram of another terminal device according to an embodiment of this application.

When an integrated unit is used, FIG. 25 is another schematic composition diagram of a terminal device in the foregoing embodiments. As shown in FIG. 25, the terminal device may include a processing module 2501 and a communications module 2502.

The processing module 2501 is configured to control and manage an action of the terminal device. For example, the processing module 2501 is configured to support the terminal device in performing step S901 in the pairing method shown in FIG. 9, support the terminal device in performing steps S1001, S1002, S1007, S1008, and S1009 in the pairing method shown in FIG. 10, support the terminal device in performing steps S1801, S1802, and S1803 in the unpairing method shown in FIG. 18, and support the terminal device in performing steps S2201 and S2203 in the pairing method shown in FIG. 22, and/or configured for other processes of the technology described in this specification. The communications module 2502 is configured to support the terminal device in communicating with another network entity, for example, communicating with a functional module or a network entity shown in FIG. 1, FIG. 7, or FIG. 8A. Specifically, the communications module 2502 is configured to support the terminal device in performing steps S902 and S903 in the pairing method shown in FIG. 9, and support the terminal device in performing steps S1005, S1010, S1011, S1012, and S1013 in the pairing method shown in FIG. 10. The mobile terminal may further include a storage module 2503, configured to store program code and data of the mobile terminal.

The processing module 2501 may be a processor or a controller. The processor may implement or execute various example logical blocks, modules, and circuits described with reference to content disclosed in this application. Alternatively, the processor may be a combination of processors implementing a computing function, for example, a combination of one or more microprocessors, or a combination of a DSP and a microprocessor. The communications module 2502 may be a transceiver, a transceiver circuit, an RF circuit, a communications interface, or the like. The storage module 2503 may be a memory.

When the processing module 2501 is the processor, the communications module 2502 is the RF circuit, and the storage module 2503 is the memory, the terminal device in this embodiment of this application may be the terminal device shown in FIG. 8.

Figure 26:
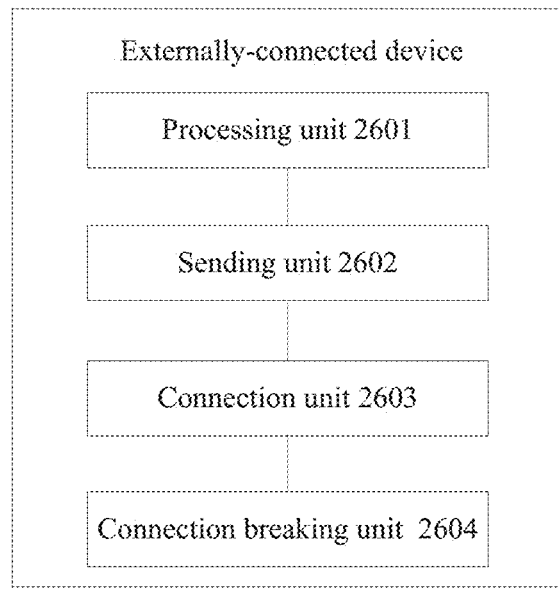
FIG. 26 is a schematic composition diagram of an externally-connected device according to an embodiment of this application.

When various functional modules corresponding to various functions are obtained through division, FIG. 26 is a possible schematic composition diagram of an externally-connected device in the foregoing embodiments. The externally-connected device includes a Hall device, or the externally-connected device connects to a Hall device. As shown in FIG. 26, the externally-connected device may include a processing unit 2601, a sending unit 2602, and a connection unit 2603.

The processing unit 2601 is configured to support the externally-connected device in performing steps S1003 and S1004 in the pairing method shown in FIG. 10, and support the externally-connected device in performing step S1804 in the unpairing method shown in FIG. 18.

The sending unit 2602 is configured to support the externally-connected device in performing step S1006 in the pairing method shown in FIG. 10.

The connection unit 2603 is configured to support the externally-connected device in performing steps S1010, S1011, S1012, and S1013 in the pairing method shown in FIG. 10.

In this embodiment of this application, further, as shown in FIG. 26, the externally-connected device may further include a connection breaking unit 2604.

The connection breaking unit 2604 is configured to support the externally-connected device in performing step S1805 in the unpairing method shown in FIG. 18.

It should be noted that all related content of various steps in the foregoing method embodiments may be cited in function descriptions of corresponding functional modules. Details are not described herein again.

The externally-connected device provided in this embodiment of this application is configured to perform the foregoing pairing method, and therefore can achieve a same effect as the foregoing pairing method.

Figure 27:
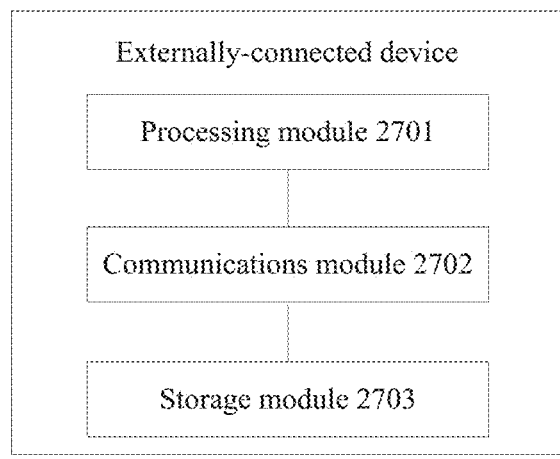
FIG. 27 is a schematic composition diagram of another externally-connected device according to an embodiment of this application.

When an integrated unit is used, FIG. 27 is another possible schematic composition diagram of an externally-connected device in the foregoing embodiments. As shown in FIG. 27, the externally-connected device may include a processing module 2701 and a communications module 2702.

The processing module 2701 is configured to control and manage an action of the externally-connected device. For example, the processing module 2701 is configured to support the externally-connected device in performing steps S1003 and S1004 in the pairing method shown in FIG. 10, and support the externally-connected device in performing steps S1804 and S1805 in the unpairing method shown in FIG. 18, and/or configured for other processes of the technology described in this specification. The communications module 2702 is configured to support the externally-connected device in communicating with another network entity, for example, communicating with a functional module or a network entity shown in FIG. 1, FIG. 7, or FIG. 8. The server may further include a storage module 2703, configured to store program code and data of the server.

The processing module 2701 may be a processor or a controller. The processor may implement or execute various example logical blocks, modules, and circuits described with reference to content disclosed in this application. Alternatively, the processor may be a combination of processors implementing a computing function, for example, a combination of one or more microprocessors, or a combination of a DSP and a microprocessor. The communications module 2702 may be a transceiver, a transceiver circuit, an RF circuit, a communications interface, or the like. The storage module 2703 may be a memory.

An embodiment of this application further provides a computer storage medium. The computer storage medium stores a computer program. When the computer program is executed by a processor, the method described in any one of FIG. 9, FIG. 10, FIG. 18, or FIG. 22 is implemented, to enable a terminal device to establish and/or break a wireless connection to an externally-connected device.

An embodiment of this application further provides a computer program product. When the computer program product is run on a computer, the computer is enabled to perform the method described in any one of FIG. 9, FIG. 10, FIG. 18, or FIG. 22, to enable a terminal device to establish and/or break a wireless connection to an externally-connected device.

An embodiment of this application further provides a chip system. The chip system may include at least one processor and a memory. The memory is configured to store a computer program, so that when the computer program is executed by the at least one processor, the method described in any one of FIG. 9, FIG. 10, FIG. 18, or FIG. 22 is implemented, to enable a terminal device in which the chip system is located to establish and/or break a wireless connection to an externally-connected device.

The foregoing descriptions about implementations allow a person skilled in the art to understand that, for the purpose of convenient and brief description, division of the foregoing functional modules is used as an example for illustration.

In actual application, the foregoing functions can be allocated to different functional modules and implemented according to a requirement, that is, an inner structure of an apparatus is divided into different functional modules to implement all or some of the functions described above.

In the several embodiments provided in this application, it should be understood that the disclosed apparatus and method may be implemented in other manners. For example, the described apparatus embodiment is merely an example. For example, the module or unit division is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of the embodiments of this application essentially, or the part contributing to the prior art, or all or some of the technical solutions may be implemented in a form of a software product. The software product is stored in a storage medium and includes several instructions for instructing a device (which may be a single-chip microcomputer, a chip, or the like) or a processor (processor) to perform all or some of the steps of the methods described in the embodiments of this application. The foregoing storage medium includes: any medium that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A pairing method implemented by a terminal device, wherein the terminal device is configured for connecting to a Hall device, and wherein the pairing method comprises:
    entering a to-be-connected state based on a Hall event of the Hall device, wherein the terminal device is configured for connecting to an external device;
    receiving mark information of the external device;
    determining whether the mark information is the same as prestored mark information;
    determining that the external device is the security device when the mark information is the same as the prestored mark information;
    determining that the external device is not the security device when the mark information is different from the prestored mark information;
    sending-a trigger signal to enable the external device to enter the to-be-connected state based on the trigger signal; and
    establishing a connection to the external device using a wireless communication protocol.

2. The pairing method of claim 1, wherein the wireless communication protocol is a BLUETOOTH protocol, and wherein before establishing the connection, the pairing method further comprises:
    identifying that the external device is a security device; and
    requesting, in response to the identifying, a connection key from the external device using just works pairing.

3. The pairing method of claim 1, wherein the wireless communication protocol is a BLUETOOTH protocol, and wherein before establishing the connection, the pairing method further comprises:
    identifying that the external device is not a security device; and
    requesting a connection key from the external device in a Link Key connection manner.

4. The pairing method of claim 1, wherein after establishing the connection, the pairing method further comprises breaking the connection to the externally-connected device based on a Hall disconnection event of the Hall device.

5. The pairing method of claim 4, wherein after breaking the connection, the pairing method further comprises deleting pairing information that is stored when the terminal device connects to the externally-connected device, and wherein the pairing information comprises at least one of address information of the externally-connected device, a service type of the externally-connected device, or a connection key used when the terminal device couples to the externally-connected device.

6. The pairing method of claim 1, wherein the trigger signal is a Hall signal.

7. The pairing method of claim 1, wherein the wireless communication protocol is a BLUETOOTH protocol, and wherein the pairing method further comprises:
    turning on a BLUETOOTH switch and entering a BLUETOOTH discoverable state based on the Hall event;
    entering the BLUETOOTH discoverable state based on the Hall event; or
    turning on the BLUETOOTH switch based on the Hall event.

8. A terminal device comprising:
    a memory configured to store a computer program; and
    a processor coupled to the memory, wherein when executed by the processor, the computer program causes the terminal device to:
        enter a to-be-connected state based on a Hall event of a Hall device, wherein the terminal device is configured to establish a connection to an external device;
        receive mark information of the external device;
        determine whether the mark information is the same as prestored mark information;
        determine that the external device is the security device when the mark information is the same as the prestored mark information;

determine that the external device is not the security device when the mark information is different from the prestored mark information;

send a trigger signal to enable the external device to enter the to-be-connected state based on the trigger signal; and establish the connection to the external device using a wireless communication protocol.

9. The terminal device of claim 8, wherein the wireless communication protocol is a BLUETOOTH protocol, and wherein before establishing the connection, the computer program further causes the terminal device to:

identify that the external device is a security device; and request, in response to the identifying, a connection key from the external device in a using just works pairing.

10. The terminal device of claim 8, wherein the wireless communication protocol is a BLUETOOTH protocol, and wherein before establishing the connection, the computer program further causes the terminal device to:

identify that the external device is not a security device; and request, in response to the identifying, a connection key from the external device in a Link Key connection manner.

11. The terminal device of claim 8, wherein after establishing the connection, the method further comprises breaking the connection to the externally-connected device based on a Hall disconnection event of the Hall device.

12. The terminal device of claim 11, wherein after breaking the connection, the computer program further causes the terminal device to delete pairing information that is stored when the terminal device connects to the externally-connected device, and wherein the pairing information comprises at least one of address information of the externally-connected device, a service type of the externally-connected device, or a connection key used when the terminal device connects to the externally-connected device.

13. The terminal device of claim 8, wherein the trigger signal is a Hall signal.

14. The terminal device of claim 8, wherein the wireless communication protocol is a BLUETOOTH protocol, and wherein the computer program further causes the terminal device to:

turn on a BLUETOOTH switch and enter a BLUETOOTH discoverable state based on the Hall event;

enter the BLUETOOTH discoverable state based on the Hall event; or turn on the BLUETOOTH switch based on the Hall event.

15. A pairing method implemented by a terminal device, wherein the terminal device comprises a Hall device, and wherein the pairing method comprises:

entering a to-be-connected state based on a Hall event of the Hall device;

receiving mark information of the external device;

determining whether the mark information is the same as prestored mark information;

determining that the external device is a security device when the mark information is the same as the prestored mark information;

determining that the external device is not a security device when the mark information is different from the prestored mark information;

sending a trigger signal to enable the external device to enter the to-be-connected state based on the trigger signal; and establishing the coupling to the external device using a wireless communication protocol.

16. The pairing method of claim 15, wherein the wireless communication protocol is a BLUETOOTH protocol, and wherein before establishing the connection, the pairing method further comprises:

identifying that the external device is a security device; and requesting, in response to the identifying, a connection key from the external device in a just works manner.

17. The pairing method of claim 15, wherein the wireless communication protocol is a BLUETOOTH protocol, and wherein before establishing the connection, the pairing method further comprises:

identifying that the external device is not a security device; and requesting a connection key from the external device in a Link Key connection manner.

18. The pairing method of claim 15, wherein after establishing the connection, the pairing method further comprises breaking the connection to the externally-connected device based on a Hall disconnection event of the Hall device.

19. The pairing method of claim 18, wherein after breaking the connection, the pairing method further comprises deleting pairing information that is stored when the terminal device connects to the externally-connected device, and wherein the pairing information comprises at least one of address information of the externally-connected device, a service type of the externally-connected device, or a connection key used when the terminal device couples to the externally-connected device.

20. The pairing method of claim 15, wherein the wireless communication protocol is a BLUETOOTH protocol, and wherein the pairing method further comprises:

turning on a BLUETOOTH switch and entering a BLUETOOTH discoverable state based on the Hall event;

entering the BLUETOOTH discoverable state based on the Hall event; or turning on the BLUETOOTH switch based on the Hall event.

* * * * *

UNITED STATES PATENT AND TRADEMARK OFFICE
CERTIFICATE OF CORRECTION

PATENT NO. : 11,310,848 B2
APPLICATION NO. : 16/643412
DATED : April 19, 2022
INVENTOR(S) : Yong Chen, Chiengchang Lee and Liping Wang It is certified that error appears in the above-identified patent and that said Letters Patent is hereby corrected as shown below:

On the Title Page

Page 2, (56) References Cited, U.S. Patent Documents: "2012/0185071 A1 6/2012 Errala" should read "2012/0185071 A1 6/2012 Herrala"

Signed and Sealed this
Fourteenth Day of June, 2022

Katherine Kelly Vidal
*Director of the United States Patent and Trademark Office*